US008635211B2

(12) United States Patent
Jiang et al.

(10) Patent No.: US 8,635,211 B2
(45) Date of Patent: Jan. 21, 2014

(54) TREND ANALYSIS IN CONTENT IDENTIFICATION BASED ON FINGERPRINTING

(75) Inventors: Wenyu Jiang, Singapore (SG); Tianshi Gao, Stanford, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 19 days.

(21) Appl. No.: 13/376,584

(22) PCT Filed: Jun. 10, 2010

(86) PCT No.: PCT/US2010/038120
§ 371 (c)(1),
(2), (4) Date: Dec. 6, 2011

(87) PCT Pub. No.: WO2010/144671
PCT Pub. Date: Dec. 16, 2010

(65) Prior Publication Data
US 2012/0078894 A1    Mar. 29, 2012

Related U.S. Application Data

(60) Provisional application No. 61/186,353, filed on Jun. 11, 2009.

(51) Int. Cl.
G06F 7/00    (2006.01)
(52) U.S. Cl.
USPC ......................................................... 707/723
(58) Field of Classification Search
USPC ......................................................... 707/723
See application file for complete search history.

(56) References Cited

U.S. PATENT DOCUMENTS

| 7,508,977 | B2 * | 3/2009 | Lyons et al. | 382/154 |
| 2002/0083060 | A1 * | 6/2002 | Wang et al. | 707/10 |
| 2009/0063277 | A1 | 3/2009 | Bernosky | |
| 2009/0304082 | A1 | 12/2009 | Radhakrishnan | |
| 2010/0205174 | A1 | 8/2010 | Jiang | |
| 2010/0238350 | A1 | 9/2010 | Radhakrishnan | |

(Continued)

FOREIGN PATENT DOCUMENTS

| CN | 101246543 | 8/2008 |
| CN | 101303729 | 11/2008 |
| WO | 2009/046438 | 4/2009 |

OTHER PUBLICATIONS

Schmidt, et al., "Scalable, Content-Based Audio Identification by Multiple Independent Psychoacoustic Matching" JAES, AES, vol. 52, No. 4, Apr. 1, 2004, pp. 366-377.

(Continued)

Primary Examiner — Jensen Hu

(57) ABSTRACT

Fingerprint-based content identification is described. Bin-counting detects linear trends based on data points that are generated from a set of query fingerprints, which are extracted from a query content item and a matching set of corresponding reference content items that are extracted from a reference content item. RANSAC may detect trends based on confidence scores that are computed for multiple candidate content items. The trends detected for the candidate content items are compared against a threshold in order of decreasing confidence score until a trend that satisfies the threshold is found. A ranking-based mechanism for fingerprint-based content identification may use a bin-counting or RANSAC-based trend detection mechanism to identify duplicate or multiple reference content items that all match the same query content item.

7 Claims, 8 Drawing Sheets

(56) References Cited

U.S. PATENT DOCUMENTS

| | | |
|---|---|---|
| 2011/0022633 A1 | 1/2011 | Bernosky |
| 2011/0035382 A1 | 2/2011 | Bauer |
| 2011/0142348 A1 | 6/2011 | Radhakrishnan |
| 2011/0153050 A1 | 6/2011 | Bauer |
| 2011/0188704 A1 | 8/2011 | Radhakrishnan |
| 2011/0216937 A1 | 9/2011 | Radhakrishnan |

OTHER PUBLICATIONS

Weisberg, Sanford, "Applied Linear Regression, Third Edition" Jan. 27, 2005, pp. 1-46, The residuals, p. 36-p. 38.

Lee, et al., "Robust Video Fingerprinting Based on Affine Covariant Regions" Acoustics, Speech and Signal Processing, 2008. IEEE International Conference on IEEE, Piscataway, NJ, USA, Mar. 31, 2008, pp. 1237-1240.

Den Hollander R J M, "Random Sampling Methods for Two-View Geometry Estimation" May 10, 2007, pp. 1-124 (Chapter 4 Weighted Data Sampling in the RANSAC Algorithm).

Pylvanainen, et al., "Hill Climbing Algorithm for Random Sample Consensus Methods" Nov. 26, 2007, Advances in Visual Computing, Springer Berlin, pp. 672-681.

Fan, et al., "Robust Scale Estimattion from Ensemble Inlier Sets for Random Sample Consensus Methods" Oct. 12, 2008, Computer Vision A ECCV 2008, pp. 182-195.

Cano, P., et al., "A Review of Algorithms for Audio Fingerprinting" Proceedings of the 2003 IEEE Radar Conference, Hunstville, AL, May 5-8, 2003, New York; IEEE Radar Conference, New York, NY US, Dec. 9, 2002, pp. 169-173.

Saracoglu, A et al., "Content Based Copy Detection with Coarse Audio-Visual Fingerprints" Content-Based Multimedia Indexing, 2009 Seventh International Workshop on IEEE, Piscataway, NJ, USA, Jun. 3, 2009, pp. 213-218.

Wikipedia, "Linear Least Squares" page last modified on Jan. 23, 2011.

Wikipedia, "RANSAC", pages last modified on Nov. 17, 2011.

\* cited by examiner

TREND ANALYSIS IN CONTENT IDENTIFICATION BASED ON FINGERPRINTING

CROSS-REFERENCE TO RELATED APPLICATIONS

This application claims priority to U.S. Patent Provisional No. 61/186,353, filed 11 Jun. 2009, hereby incorporated by reference in its entirety.

TECHNICAL FIELD

The present disclosure relates to media content identification based on fingerprinting.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As a result of widespread and growing use, vast quantities of media content exist nowadays. Given the sheer quantity and variety of audio and video content that exists in various formats and encodings, and the expanding growth of that content over time, the ability to correctly identify media content is of particular value. One type of approaches for identifying media content is based on the use of media fingerprints.

Media fingerprints are identifiers of the media content from which the media fingerprints are derived, extracted, or generated. For example, acoustic fingerprints may be derived or otherwise generated from a particular audio waveform as code that uniquely corresponds thereto, and video fingerprints may be derived or otherwise generated from a particular video sequence based on video content characteristics such as luminance, chrominance, and motion descriptors. Media fingerprints may be stored in repositories in association with various metadata information that describe and identify the media content items from which the individual fingerprints are generated. The stored media fingerprints may be accessed to identify, categorize, or otherwise classify an item or a sample of media content, such as music or other audio content and a video sequence or other video content. Such identification, categorization, and classification of media content may be useful in a variety of contexts such as copyright management, validation of authorized uses of content, and detection of unauthorized use of various versions, copies, and other items of content.

BRIEF DESCRIPTION OF THE DRAWINGS

In the figures of the accompanying drawings like reference numerals refer to similar elements.

DESCRIPTION OF EXAMPLE EMBODIMENTS

Figure 1:
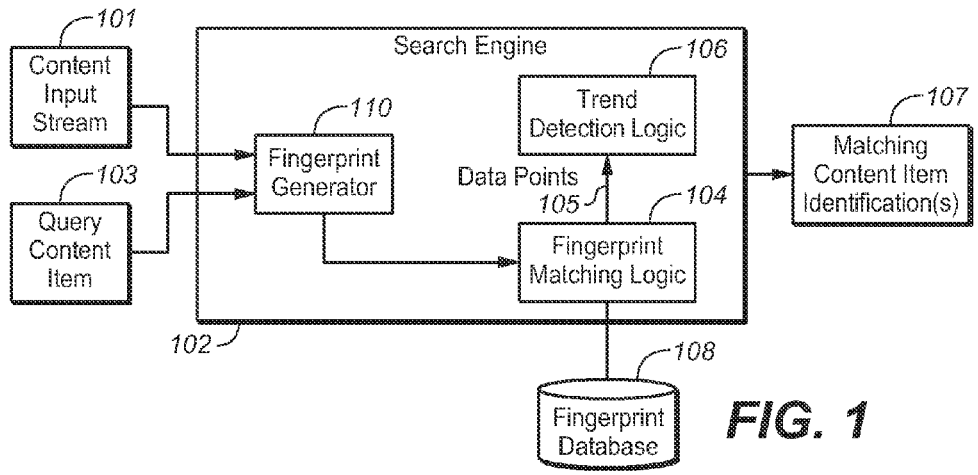
FIG. 1 is a block diagram that illustrates an example operational context in which embodiments of the techniques described herein may be implemented.

Techniques are provided for linear trend analysis in content identification based on fingerprints. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 Overview
2.0 Example Operational Context
3.0 Bin-Counting Mechanism for Detecting Linear Trends
   3.1 Example Bin-Counting Method
   3.2 Data Point Transformation
   3.3 Bin Size and Data Point Counting
   3.4 Threshold Determination and Trend Detection
   3.5 Additional Features
4.0 RANSAC-Based Mechanism for Detecting Linear Trends
   4.1 Selecting a Model to Match
   4.2 Example Non-Linear Trends
   4.3 Example RANSAC-Based Method For Detecting Linear Trends
   4.4 Time Window Determination
   4.5 Grouping, Sorting, and Selection of Candidates
   4.6 Fitting a Trend by Using RANSAC
   4.7 Confidence Score Determination
   4.8 Final Verification
   4.9 Detecting Non-Linear Trends by Using RANSAC
5.0 Ranking-Based Mechanism for Content Identification
6.0 Implementation Mechanisms—Hardware Overview
7.0 Equivalents, Extensions, Miscellaneous and Alternatives
8.0 Example Embodiments

1.0 Overview

This section provides a conceptual prelude to techniques that are described in more detail in the sections that follow. Therefore, this section should not be read as a summary of the techniques described herein and is to be considered in an illustrative rather than a restrictive sense.

As used herein, "fingerprint" relates to a concatenation of signatures (which may also be referred to as codewords, sub-fingerprints, and hash values) that are extracted, derived, or otherwise generated from a consecutive sequence of media frames. Each signature is a short data string that is a high-level representation of its corresponding media frame or sequence of frames. The signatures may be extracted or derived from the media frames at a nominal rate (e.g., 12 frames per second, or fps) in order to account for frame rate changes. "Content item" relates to a unit of media content. "Reference fingerprint" relates to a fingerprint that is extracted, derived, or otherwise generated from a known and identified content item, and "query fingerprint" relates to a fingerprint that is extracted, derived, or otherwise generated from a content item (also referred to as "query content item") that needs to be identified.

In general, fingerprint-based media content identification involves searching for the best matches between reference fingerprints stored in a repository and query fingerprints generated from a query content item that needs to be identified. In the repository, each reference fingerprint is associated with various metadata information that describes and identifies the reference content item from which that reference fingerprint was generated. Examples of such metadata information include, but are not limited to, a content identifier (e.g., a filename, a stream ID, etc.), a content description, and a time location (or offset) of the fingerprint within the content item from which fingerprint was generated.

As used herein, "fingerprint query" relates to a query or other request that is performed on the unit of a fingerprint, where the unit corresponds to a short time window of content (e.g., a 3 second window). A fingerprint query typically specifies a certain fingerprint and, when executed or otherwise performed against a repository of reference fingerprints, returns at least the metadata information associated with those reference fingerprint(s) from the repository which best match the certain fingerprint.

The query result from an individual fingerprint query may include the content identifier of a reference content item and the time location (or offset) of the matching reference fingerprint within the reference content item. Thus, the query results from multiple queries, which respectively specify multiple query fingerprints that are spaced apart at some time intervals in the underlying query content item, can include a set of time locations for the correspondingly matching reference fingerprints. This set of time locations would exhibit a linear trend with respect to the time locations of the multiple query fingerprints when the matching reference fingerprints come from a content item that correctly matches the query content item. Therefore, identifying a linear trend for multiple, spaced-apart query fingerprints and their corresponding matching reference fingerprints can improve the accuracy of the identification of the query content item, especially when the query content item has been severely modified and/or when the query results include many irrelevant or incorrect matches.

As used herein, "linear trend" relates to a positioning of data points in a region along a line that is characterized by a slope value and an intercept value. A data point is represented by a pair of time values, where the first value in the pair is the time location of a query fingerprint within a query content item, and the second value in the pair is the time location of a matching reference fingerprint within a reference content item.

One approach for improving fingerprint search accuracy uses a combination of majority voting and linear trend detection. In this approach, a linear trend is detected by computing, for all matches that return the same content identifier, the offset difference between the time location of a query fingerprint and the time location of the matched reference fingerprint. The pair of reference fingerprints that produces the smallest offset difference is then considered to exhibit the best linear trend; if this smallest offset difference is smaller than some threshold, then the reference content item corresponding to that linear trend is considered the correct answer. This approach assumes that a linear trend has a slope of "1.0". This means that all values of the offset difference are supposed to be the same value, e.g., some constant, and therefore choosing the pair of reference fingerprints with the smallest offset difference is a good indicator of linear trend. Embodiments of the techniques described herein may increase the fingerprint search accuracy, in relation to accuracy that may be achieved with an approach that uses a combination of majority voting and linear trend detection. For example, embodiments of the techniques described herein are more accurate when detecting linear trends with slopes different than "1.0", which can happen if the frame rate in the query content item is modified intentionally—e.g., when a video clip is played at 50% faster rate or when a 24 fps clip is converted to a PAL format at 25 fps without inserting duplicate or interpolating frames. In another example, embodiments of the techniques described herein are more robust when detecting linear trends from only a small portion of data points, out of many data points, that have the correct content identifiers and exhibit the correct linear trend.

The techniques described herein provide several mechanisms for trend detection in fingerprint-based content identification, where different embodiments may use different combinations of these mechanisms. In one embodiment according to the techniques described herein, trends may be detected based on bin-counting of data points, on a RANSAC ("RANdom SAmple Consensus") derived confidence scores, on ranking content identifications based on at least one of bin-counting of data points and RANSAC derived confidence scores, and/or on any combination thereof. In this embodiment, a method comprises one or more of the steps of: detecting linear trends based on bin-counting of data points that are generated from a set of query fingerprints, which are extracted from a query content item, and a set of correspondingly matching reference content items, which are extracted from a reference content item; detecting trends based on a RANSAC derived confidence scores that are computed for multiple candidate content items, where the trends detected for the candidate content items are compared against a threshold in order of decreasing confidence score until a trend that satisfies the threshold is found; or ranking fingerprint derived content identifications based on at least one of the bin-counting based detecting step or the RANSAC based detecting step, where duplicate or multiple reference content items are identified, which all match the same query content item; and computing an identity of the query content item based on one or more of the detected trends or the ranked identifications.

In one embodiment according to the techniques described herein, a bin-counting linear trend detection mechanism may be implemented to identify a query content item. Multiple data points are obtained from query fingerprints and respectively matching reference fingerprints, where each data point is represented by a pair of time values that includes a time location of a query fingerprint and a time location of the respectively matching reference fingerprint. A slope value for the data points is then determined. Detection of a linear trend is then performed for the data points where, if found, the linear trend would indicate a reference content item that matches the query content item from which the query fingerprints are derived. To detect the linear trend, multiple time offsets that respectively correspond to the multiple data points are first determined. The time offset for each data point is computed by subtracting, from the time location of a reference fingerprint included in that data point, the multiplicative product of the slope value and the time location of the corresponding query fingerprint included in that data point. The data points are then grouped into multiple bins based on the computed time offsets, where the bins have the same bin size and each bin represents a particular time offset span that does not overlap with any other time offset spans of any other bins. The data points in each bin are counted in order to determine the bin having the maximum number of data points. One or more metrics for the maximum bin are determined and then compared to a current threshold. When the one or more metrics exceed the current threshold, a determination is made that the data points exhibit a linear trend that has the current slope value and therefore the reference content item corresponding to the data points is identified as a matching content item. When the one or more metrics do not exceed the current threshold, a linear regression is applied to the data points included in the bin with the maximum count in order to determine a new slope value. A more restrictive threshold is also determined, and the bin-counting mechanism is applied again to all data points with the new slope value and the new threshold.

In one embodiment according to the techniques described herein, a RANSAC-based trend detection mechanism may be implemented to identify a query content item. The RANSAC-based mechanism may use a linear model or a non-linear model to determine a trend that is exhibited by multiple query results that are obtained from a fingerprint database for query fingerprints extracted from the query content item. A time window is determined for the query content item. The query results are grouped into multiple groups corresponding to the content identifiers returned in the query results, where the content identifiers respectively indicate candidate content items. A RANSAC algorithm is then applied for each candidate content item in order to determine a trend exhibited by the data points associated with that candidate content item. A confidence score is then computed for each candidate content item, where the confidence score is based on the values of one or more coefficients and the number of in-lier data points of the trend determined according to the underlying model for that candidate content item. The candidate content items are then sorted by their confidence scores. Starting with the candidate content item having the highest confidence score, the trends for the candidate content items are checked against a threshold one by one until a trend that satisfies the threshold is found or until all trends are checked against the threshold. The candidate content item associated with the first trend that satisfies the threshold is identified as a reference content item that matches the query content item being identified.

In one embodiment according to the techniques described herein, a ranking-based mechanism may be implemented to identify duplicate or multiple reference content items that all match a given query content item. A number of multiple different query results, from among a set of query results, are returned for the same fingerprint query of a set of fingerprint queries that are performed for a given query content item. The set of query results, including the multiple different query results, are grouped into multiple groups corresponding to the content identifiers returned in the query results, where the content identifiers respectively indicate candidate content items. A trend detection mechanism such as, for example, a bin-counting or RANSAC-based mechanism, is applied for each candidate content item in order to determine a trend that fits the data points associated with that candidate content item. Based on the trends determined for the candidate content items, multiple matching content items are identified, where the number of the multiple matching content items is greater than or equal to the number of the multiple different query results.

Typical approaches to identifying media content based on media fingerprints have used some form of pattern matching search between reference fingerprints stored in a repository and query fingerprints derived from a query content item that needs to be identified. Embodiments of the techniques described herein may increase the accuracy of content identification, in relation to accuracy that may be achieved with such pattern matching searches. For example, embodiments of the techniques described herein are less sensitive to the possibility of distortions in the audio/video signal from which the query content item is captured, the possibility of accidental or deliberate changes or edits to the query content item, the possibility of fingerprint variations due to differences in formats and encodings, and/or the possibility of mismatched time alignment between the reference fingerprints and the query fingerprints, which may affect the accuracy achievable with pattern matching searches.

2.0 Example Operational Context

FIG. 1 is a block diagram that illustrates an example operational context in which embodiments of the techniques described herein may be implemented.

Fingerprint database 108 is communicatively or operatively coupled to search engine 102. Fingerprint database 108 is configured to store reference fingerprints and may be organized as any suitable data repository including, but not limited to, a relational database, an object-relational database, and a file or files in one or more file systems.

Search engine 102 comprises fingerprint generator logic 110, fingerprint matching logic 104, and trend detection logic 106. In various embodiments, fingerprint generator logic 110, fingerprint matching logic 104, and trend detection logic 106 may be implemented as separate components or as one integrated components that may perform additional functionalities. As used herein, "logic" relates to a set of instructions which, when executed by one or more processors, are operable to perform one or more functionalities. In various embodiments and implementations, any such logic may be implemented as one or more software components that are executable by one or more processors, as one or more hardware components such as Application-Specific Integrated Circuits (ASICs) or other programmable Integrated Circuits (ICs), or as any combination of software and hardware components. For example, any particular logic may be implemented, without limitation, as one or more software modules, as one or more libraries of functions, as one or more dynamically linked libraries, as a standalone or a client-server software application, and as a browser plug-in. In various embodiments and implementations, search engine 102 may be configured to execute in one or more special-purpose computing devices, which may operate under control of instructions that are encoded in various storage media. For example, search engine 102 may be a standalone or distributed application or module that may be configured in various computing environments including, but not limited to, a network-capable media player, a content encoder and/or decoder, a web search server, an indexing server, and a web browser.

Fingerprint generator logic 110 is operable to derive query fingerprints from media content such as, for example, content input streams and query content items, and to pass the derived query fingerprints to the fingerprint matching logic 104. Fingerprint matching logic 104 is operable to compare a query fingerprint to reference fingerprints stored in fingerprint database 108, and to return any reference fingerprint(s) that match the query fingerprint. Fingerprint matching logic 104 may be operable to generate fingerprint queries and to execute, or cause the execution of, the fingerprint queries against fingerprint database 108. For example, fingerprint matching logic 104 may be operable to execute fingerprint queries by making calls to database drivers (e.g., ODBC or JDBC drivers); to application programming interfaces (APIs) that can access information in fingerprint databases, and/or directly to various database servers that manage the fingerprint databases. In some embodiments, a fingerprint generator may not be included within the search engine as a separate component, but the fingerprint matching logic itself may include a component that is operable to generate the query fingerprints from query content items.

According to the techniques described herein, fingerprint matching logic 104 and/or another component of search engine 102 may be operable to generate data points based on the query fingerprints being processed and their correspondingly matching reference fingerprints. For example, when fingerprint matching logic 104 finds a reference fingerprint that matches a given query fingerprint, the fingerprint matching logic may be operable to determine, and pair with each other, the time location of the query fingerprint within the query content item and the time location of the matching reference fingerprint that is retrieved from fingerprint database 108.

According to the techniques described herein, fingerprint matching logic 104 is operable to pass any generated data points to trend detection logic 106. In some embodiments, fingerprint matching logic 104 is also operable to pass to trend detection logic 106 any content identifiers that are retrieved from fingerprint database 108 and that identify the reference content items that include the matching reference fingerprints.

Trend detection logic 106 is operable to perform trend detection in accordance with one or more of the mechanisms for trend detection and content identification described herein. For example, based on data points received from fingerprint matching logic 104, in one embodiment trend detection logic 106 may be operable to perform the bin-counting mechanism described herein in order to detect linear trends among the received data points. In one embodiment, trend detection logic 106 may be operable to perform the RANSAC-based mechanism that is described herein for detecting linear or non-linear trends among the received data points. In one embodiment, trend detection logic 106 may be operable to perform the ranking-based mechanism for content identification described herein. In yet another embodiment, trend detection logic 106 may be operable to perform any combination of some or all of the bin-counting, RANSAC-based, and ranking-based mechanisms described herein.

In operation, search engine 102 is operable to receive media content and to process the media content in order to identify matching reference content. For example, search engine 102 may be configured to operate on-line and to perform content identification based on trends over content input streams that may carry various digital content items. In addition, or instead of, search engine 102 may be configured to operate off-line and to perform content identification over discrete content items that are received from clients or other system processes.

For example, search engine 102 may be operable to receive query content item 103 (in off-line operation) or to extract as a query content item a portion of content input stream 101 (in on-line operation). In response to search engine 102 receiving or extracting a particular query content item, fingerprint generator logic 110 generates a set of query fingerprints from the query content item. The set of query fingerprints are then passed to fingerprint matching logic 104. Fingerprint matching logic 104 then generates a set of fingerprint queries and executes, or causes the execution of, the fingerprint queries against fingerprint database 108. The results, which are returned from fingerprint database 108 in response to the fingerprint queries, include a set of reference fingerprints that match the query fingerprints generated from the query content item. The results also include, in respective association with the set of reference fingerprints, a set of content identifiers (e.g., filenames or stream IDs) of those reference content items from which the set of reference fingerprints are generated. Fingerprint matching logic 104 then generates data points 105 from the query fingerprints and the reference fingerprints, and passes these data points to trend detection logic 106. In response to receiving data points 105, trend detection logic 106 performs one or more of the bin-counting, RANSAC-based, and ranking-based mechanisms in accordance with the techniques described herein. The results of performing the trend detection mechanism(s) are then used by search engine 102 to determine and output one or more content item identifications 107 that indicate one or more content items that match the query content item being processed.

The techniques described herein are not limited to being implemented for any particular type of digital content. For example, the trend detection mechanisms described herein may be applied equally to video content and audio content. Examples of audio content include, but are not limited to, music, speech, and sounds. Audio content may be stored on compact disks (CD) or other types of storage media, transmitted with analog and digital electromagnetic signals, or streamed over one or more networks as digital files between servers and client devices such as various types of computer systems, cellular phones, personal digital assistants (PDA), and handheld computers. Examples of video content include, but are not limited to, movies and other recorded performances, presentations, animations, and any portions thereof which may sometimes be called "clips". Video content may be stored on Digital Versatile Disks (DVD) or other storage media, transmitted with analog and digital electromagnetic signals, or streamed over one or more networks as digital files between servers and various types of client devices.

Audio content is identifiable with acoustic fingerprints. An acoustic fingerprint is generated from a particular audio waveform as code that uniquely corresponds thereto. Upon generating an acoustic fingerprint, the corresponding waveform from which the fingerprint was generated may thereafter be identified by reference to its fingerprint. Acoustic fingerprints may be used to identify, categorize or otherwise classify an audio sample. Acoustic fingerprints are thus useful in identifying music or other recorded, streamed or otherwise transmitted audio media being played by a user, managing sound libraries, monitoring broadcasts, network activities and advertising, and identifying video content (such as a movie) from audio content (such as a soundtrack) associated therewith.

Analogous to identifying audio content by comparison with acoustic fingerprints is the ability to identify video content with video fingerprints. Video fingerprints are generated from the video content to which they correspond. A sequence of video information, e.g., a video stream or clip, is accessed and analyzed. Components characteristic of the video sequence are identified and derived therefrom. Characteristic components may include luminance, chrominance, motion descriptors and/or other features that may be perceived by the human psychovisual system. The derived characteristic components may be compressed into a readily storable and retrievable format. Video fingerprints may be used for comparison to a sample of a video sequence, which allows accurate identification of the video content in the sequence. Video fingerprints are thus useful for accurately identifying video content for a user as the content is viewed, as well as in authoritatively managing copyrights, and in validating authorized, and detecting unauthorized, versions and items of content being stored, streamed or otherwise used.

3.0 Bin-Counting Mechanism for Detecting Linear Trends

According to the techniques described herein, a bin-counting mechanism for detecting linear trends relies on data points that are derived from the time locations of query fingerprints in a query content item and the time locations of reference fingerprints in reference content items. While a linear regression method (e.g., a least square error optimization method) may use data points to detect linear trends, in the context of fingerprint content identification such method would only work when most of the data points are in-liers. If there are many out-liers or a few out-liers that significantly deviate from the actual trend line, the slope derived by such linear regression method may be far off from the actual slope value.

As used herein, "in-lier" and "in-lier data point" relate to a data point that is close to a trend line as determined by some metric; "out-lier" and "out-lier data point" relate to a data point that is not close to a trend line as determined by some metric. As used herein, "slope" and "slope value", and "intercept" and "intercept value", relate to standard mathematical terms that are used to define a line that is plotted on a two-dimensional "x-y" graph. For example, "slope" and "slope value" relate to the rate at which the line rises above the horizontal "x"-axis, and "intercept" and "intercept value" relate to the perpendicular distance from the "x"-axis to the point at which the line crosses the vertical "y"-axis.

In the context of fingerprint content identification, a linear trend exhibited by a set of data points is due to a one-to-one mapping of time locations between a query content item being identified and a matching reference content item. Therefore, the slope value of the linear trend is usually close to "1.0". Thus, according to the bin-counting mechanism described herein, if the difference (denoted $t_{offset}$ between the time locations of the query fingerprints and the corresponding reference fingerprints, is plotted on a two-dimensional graph along the vertical "y"-axis, and the time locations of the query fingerprints are plotted along the horizontal "x"-axis, the scatter plot is supposed to exhibit a flat line with a slope close to "0". Such flat line would not indicate what the intercept is, but the "y"-values of the in-lier data points will be close to the intercept. Thus, if the value range spanning the "y"-values (e.g., value range of $t_{offset}$ along the "y"-axis) is divided into a sequence of bins that represent equal non-overlapping time offset spans, and a count is determined of how many data points (associated with the same content identifier) fall into the same bin, then the bin representing the correct intercept should have the highest count of data points. This is because while the out-lier data points by nature are scattered and random and could indicate any intercept, the in-lier data points by definition are close to the correct intercept. In turn, this leads to a high concentration of data points in the bin associated with a value that is the correct or close to the correct intercept.

3.1 Example Bin-Counting Method

Figure 2A:
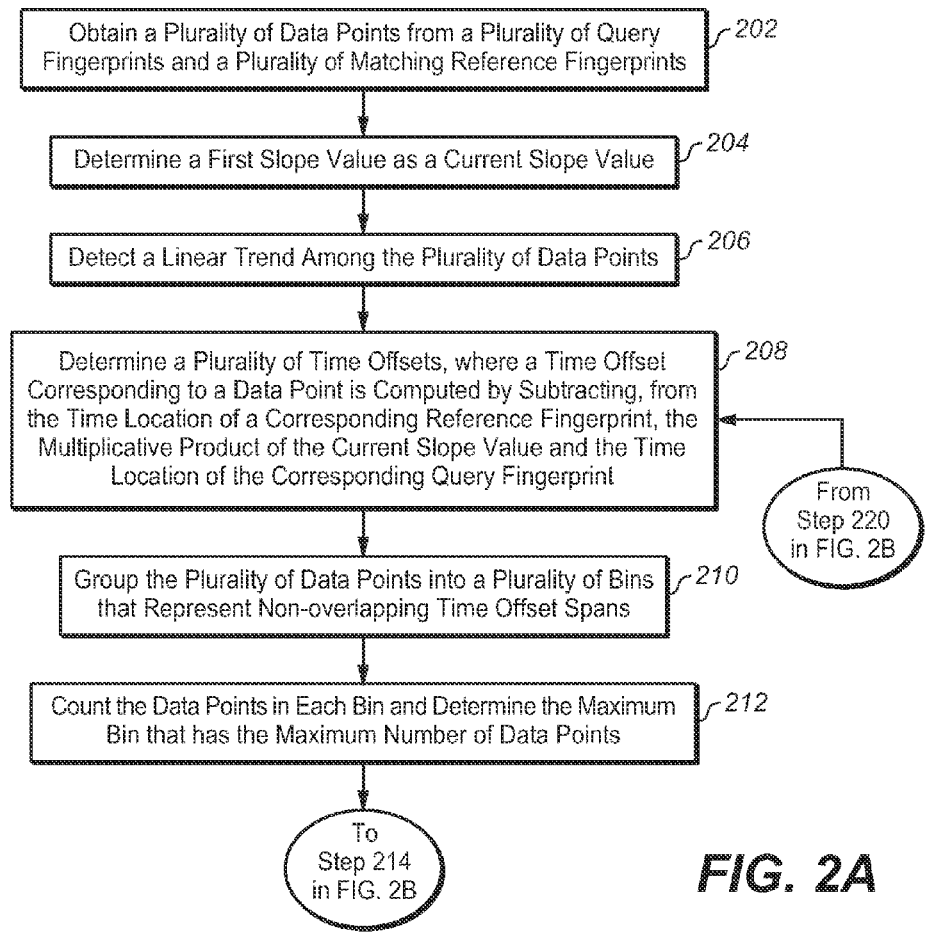
FIG. 2A and FIG. 2B are flow diagrams that collectively illustrate a bin-counting mechanism for detecting linear trends in fingerprinting-based content identification according to an example embodiment.
Figure 2B:
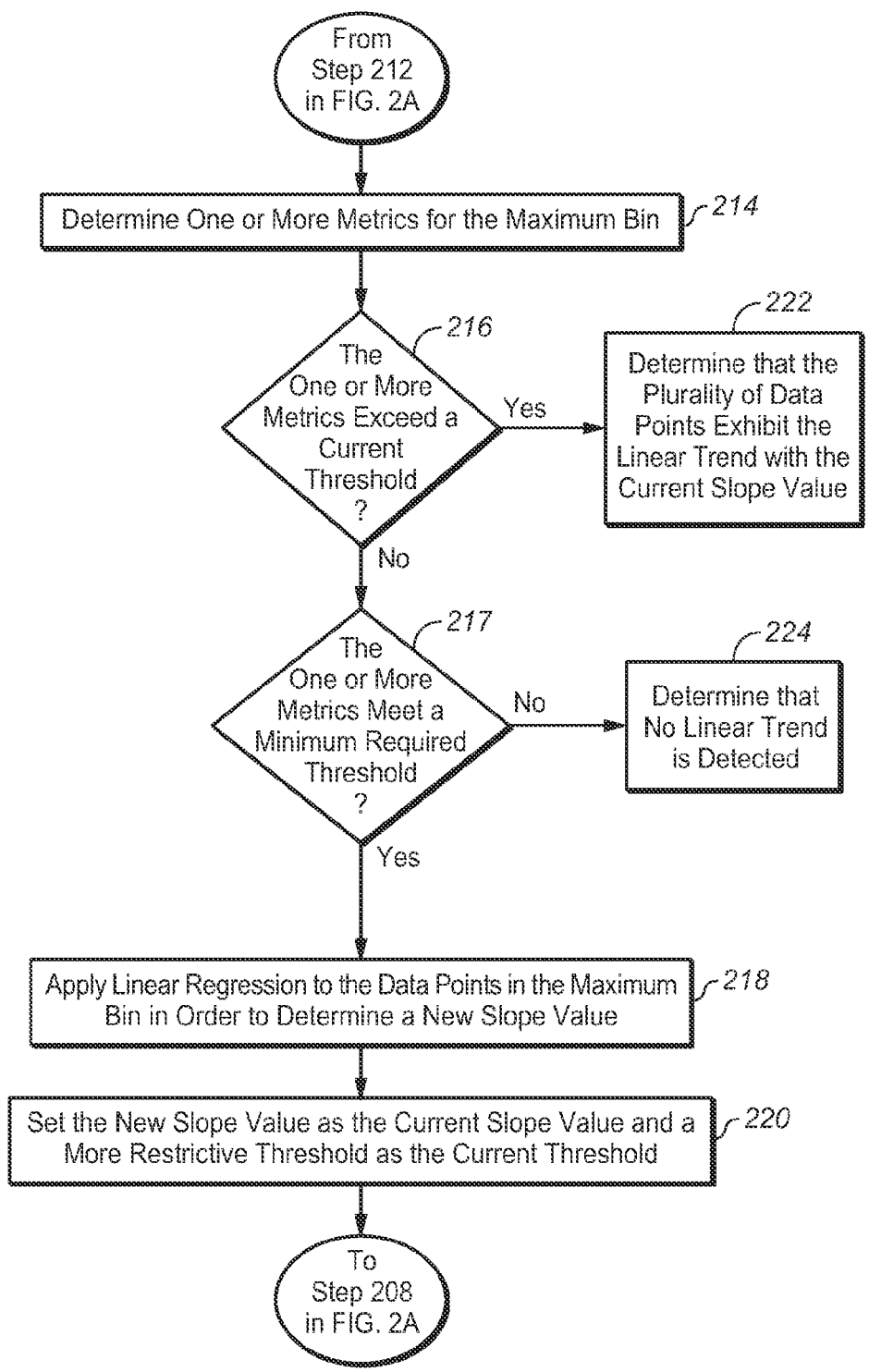

FIGS. 2A and 2B are flow diagrams that collectively illustrate an example bin-counting mechanism for detecting linear trends in fingerprinting-based content identification according to one embodiment. The bin-counting mechanism may be implemented by a variety of software components and in a variety of operational contexts. For example, in one operational context, the steps of the method in FIGS. 2A and 2B may be performed by one or more modules of a search engine, such as search engine 102 in FIG. 1. For illustration purposes only, the steps of the method illustrated in FIGS. 2A and 2B are described hereinafter as being performed by a search engine; however, it is noted that in various embodiments and operational contexts the steps of the method in FIGS. 2A and 2B may be performed by software and/or hardware components other than a search engine.

Referring to FIG. 2A, in step 202 a search engine obtains a plurality of data points from a plurality of query fingerprints and a plurality of correspondingly matching reference fingerprints. For example, the search engine or a component thereof may receive a query content item for which identification needs to be performed. The search engine or the component thereof extracts the query fingerprints from the query content item and searches a fingerprint database to find reference fingerprints, which match the extracted query fingerprints and which are associated with the same content identifier that identifies the same reference content item. If the found reference fingerprints are associated with different content identifiers, and thus indicate different reference content items, the reference fingerprints are first sorted into groups by their content identifiers, and the steps of the method in FIGS. 2A and 2B are performed separately for each group in order to determine whether the data points in that group exhibit a linear trend and therefore indicate a reference content item that matches the query content item.

In step 204, the search engine or a component thereof determines a first slope value, and sets the determined slope value as the current slope value for a first pass at detecting a linear trend. For example, the search engine may initially select a slope value that is substantially equal of "1.0". In some embodiments, the search engine or the component thereof may apply a RANSAC algorithm to the plurality of data points in order to determine the initial slope value.

In step 206, the search engine detects a linear trend based on the current slope value and the obtained data points. It is noted that in some embodiments, steps 208 through 222 may be performed as sub-steps of step 206. Further, step 208 through step 222 may be performed in several passes, where each pass may use different current parameters such as thresholds, metrics, slope values, and bin sizes. According to the bin-counting mechanism described herein, the goal in performing multiple passes at detecting a linear trend among the data points is to determine a more accurate linear trend. If after a predetermined number of passes the specified thresholds have not been met, then it can be determined that the data points do not exhibit a linear trend and therefore the reference content item associated with the data points does not match the query content item.

In step 208, the search engine or a component thereof performs a data transformation over the obtained data points to determine a plurality of time offsets that respectively correspond to the obtained data points. For example, a time offset corresponding to a data point is computed by subtracting, from the time location of the reference fingerprint for that data point, the multiplicative product of the current slope value and the time location of the query fingerprint for that data point. Empirically, such data transformation may be represented by the linear equation $$t_{offset} = t_f - k * t_q$$

where k is the current slope value and $t_{offset}$ is the computed time offset for a data point, which includes the time location $t_q$ of a query fingerprint in the query content item and the time location $t_f$ of a matching reference fingerprint in a reference content item.

In step 210, the search engine or a component thereof groups the data points into non-overlapping bins based on the computed time offsets. Each bin represents a time offset span that does not overlap with any other time offset span for any other bin. In some embodiments, all bins may be set to have the same bin size. The bin size may be determined by first computing the time interval between the minimum time offset and the maximum time offset of all computed time offsets, and then dividing this time interval by a fixed number.

In step 212, the search engine or a component thereof counts the data points in each bin in order to determine the bin having the maximum count of data points (also referred to as the "maximum bin"). For example, the search engine or a component thereof may count the data points in each particular bin by comparing the time offsets associated with the data points to the time offset spans represented by each bin, and by counting how many time offsets fall within each time offset span.

Referring to FIG. 2B, in step 214 the search engine or a component thereof determines one or more metrics for the maximum bin. The one or more metrics may include an absolute metric and/or a relative metric that may be used to determine the accuracy of the linear trend exhibited by the data points in the maximum bin. For example, in some embodiments the absolute metric may be the count of data points in the maximum bin and the relative metric may be the ratio between the count of data points in the maximum bin and the total number of data points across all bins.

In step 216, the search engine or a component thereof determines whether the metrics determined in step 214 exceed a current threshold. The current threshold may include one or more threshold values, which may be pre-configured as constants or which may be dynamically computed or otherwise determined for each separate linear trend detection pass that is performed for the same set of data points. For example, in various implementations a threshold value may be determined by multiplying a constant value to one of: an average count of data points in the bins; a total number of data points in the bins; and an average count of data points in those bins that include at least one data point. In embodiments that compute an absolute metric and a relative metric for the maximum bin, the threshold in step 216 may include an absolute threshold value and a relative threshold value. In these embodiments, to determine whether the linear trend exhibited by the data points in the maximum bin is accurate, in step 216 the absolute metric may be compared to the absolute threshold value and the relative metric may be compared to the relative threshold value.

If in step 216 the search engine or the component thereof determines that the one or more metrics computed for the maximum bin exceed the current threshold, then in step 222 the search engine and the component thereof determine that the data points obtained for the query content item being processed exhibit a linear trend that has the current slope value. Thereafter, based on the current slope value and on the data points, the search engine or the component thereof may determine the intercept value for the linear trend.

If in step 216 the search engine or the component thereof determines that the one or more metrics computed for the maximum bin do not exceed the current threshold, then in step 217 the search engine or the component thereof determine whether the one or more metrics meet a minimum required threshold value. If in step 217 it is determined that the one or more metrics do not meet the minimum required threshold value, then in step 224 the search engine determines that no linear trend is detected among the plurality of data points and stops the search. If in step 217 it is determined that the one or more metrics meet the required threshold value, then in step 218 the search engine or the component thereof applies a linear regression to the data points in the maximum bin to determine a new slope value. In some embodiments, out-lier data points may be identified and removed prior to applying the linear regression, and thus the linear regression would be applied only on in-lier data points. The linear regression applied in step 218 may use any known or later developed regression algorithm that can determine the slope of a straight line by analyzing the relationship between the time locations of the reference fingerprints (modeled as dependent variable in the regression) and the time locations of the query fingerprints (modeled as independent variable in the regression).

In step 220, the search engine or the component thereof sets the new slope value as the current slope value and repeats step 208 through step 224 in a second (or additional) pass over all data points. In addition, in step 220 the search engine or the component thereof may also set a new current threshold that is more restrictive than the previously used threshold.

In this manner, the bin-counting mechanism for detecting linear trends may be performed on a set of data points in multiple passes in order to determine more accurate parameters (e.g., slope and intercept) for any linear trend that is exhibited by the set of data points. When a predetermined number of passes have been performed but no threshold has been satisfied, the bin-counting mechanism may generate a result indicating that the set of data points do not exhibit a linear trend and therefore the reference content item associated with the data points does not match the query content item.

3.2 Data Point Transformation

Figure 3A:
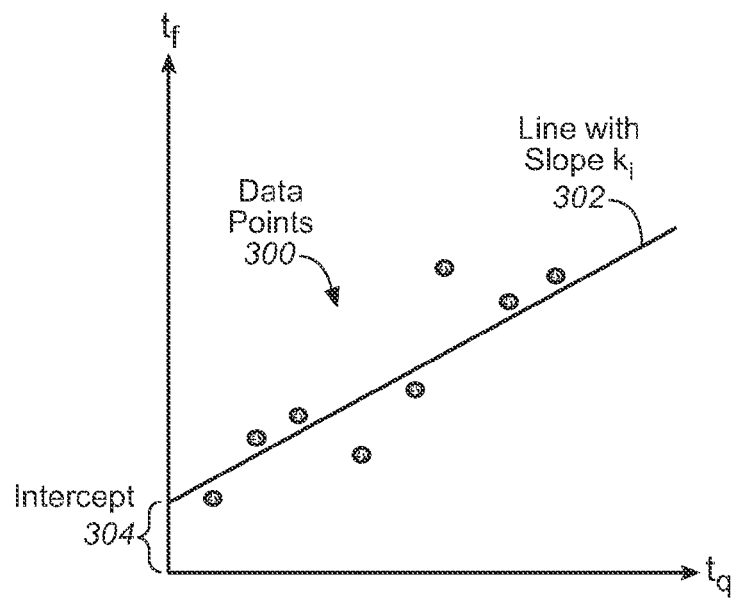
FIG. 3A and FIG. 3B are block diagrams that collectively illustrate a data point transformation in a bin-counting mechanism according to an example embodiment.
Figure 3B:
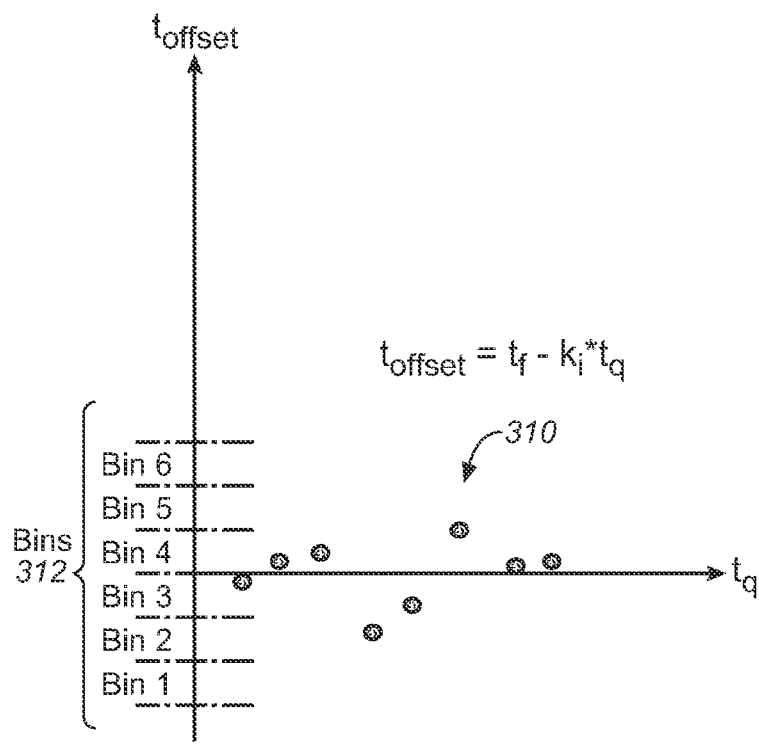

FIGS. 3A and 3B are block diagrams that collectively illustrate a data point transformation that may be used in an example bin-counting mechanism to group data points into bins.

FIG. 3A illustrates a two-dimensional graph on which data points 300 are plotted. The horizontal axis of the graph represents the time locations $t_q$ of the query fingerprints that comprise the data points, and the vertical axis of the graph represents the time locations $t_f$ of the reference fingerprints that comprise the data points. Line 302 illustrates a linear trend that is to be determined by the bin-counting mechanism. Line 302 is defined by intercept 304 and by slope $k_i$ which represents the slope value selected or determined for the $i^{th}$ detection pass performed by the bin-counting mechanism. (It is noted that line 302 is depicted in FIG. 3A for illustrative purposes only; in fact, the goals of the bin-counting mechanism is to determine the linear trend indicated by line 302 and to determine whether this trend is accurate enough to indicate a matching reference content item.)

FIG. 3B illustrates a two-dimensional graph on which data points 300 are plotted after the data point transformation is performed. Each of data points 300 is transformed based on the following empirical equation 310

$$t_{offset} = t_f - k_i * t_q$$

where $t_{offset}$ is the time offset computed for a data point, $t_q$ is the time location of the query fingerprint for that data point, $t_f$ is the time location of the matching reference fingerprint for that data point, and $k_i$ is the slope value selected or determined for the $i^{th}$ detection pass performed by the bin-counting mechanism.

The horizontal axis of the graph in FIG. 3B represents the time locations $t_q$ of the query fingerprints that comprise the data points, and the vertical axis of the graph represents the time offsets $t_{offset}$ that are computed for data points 300 based on equation 310. Bins 312 include six bins of equal size that are determined based on the computed time offsets $t_{offset}$. As illustrated in FIG. 3B, bin "4" includes the highest count of data points of all bins, and therefore bin "4" would be determined by the bin-counting mechanism as the maximum bin.

In some embodiments, the bin-counting mechanism described herein may be implemented in several detection passes, where at each pass a different slope value may be used to detect a linear trend. In these embodiments, the selected (on the first pass) or determined (e.g., by a linear regression on subsequent passes) slope value $k_i$ may be checked whether it is within the range of real values between "0.5" and "2.5". The range [0.5, 2.5] is a suitable value range for the slope value $k_i$ because normally a query content item would not play back content that is very slow (e.g., to yield a line having slope less than "0.5") or very fast (e.g., to yield a line having slope greater than "2.5"). Further, on detection passes subsequent to the first pass, the slope value $k_i$ generated by applying a linear regression would typically be between "0.9 and "1.1". It is noted that checking whether a selected or determined slope value $k_i$ is within an expected range (e.g., such as the range [0.9, 1.1]) may improve the overall accuracy when there are a lot of "noisy" data points and therefore the bin-counting mechanism described herein may need to apply more detection passes.

3.3 Bin Size and Data Point Counting

According to the bin-counting mechanism described herein, the choice of bin size may determine the robustness and accuracy of the mechanism.

If the bin size is too small, the in-lier data points will be spread to many bins instead of being concentrated (preferably) in one bin. This will make it more difficult to distinguish between a bin containing in-lier data points and a bin containing out-lier data points. Further, if the slope of the actual linear trend is different from "1.0", then the slope of $t_{offset}$ will not be exactly "0", and the in-lier data points could spread to many bins.

On the other hand, if the bin size is too big, a bin may include the out-lier data points unexpectedly. For example, if the data points being examined actually do not exhibit any linear trend, then none of them are in-lier data points, and the bin size should be chosen small enough to avoid producing any bin that contains a concentrated number of such data points.

In some embodiments, the bin size may be determined based on two parameters—a linear parameter and an absolute parameter. The linear parameter is used to adjust the bin size to the length of the time interval during which the query fingerprints are extracted from the query content item. For example, the linear parameter would ensure that the longer the length of the time interval during which query fingerprints are extracted, the larger bin size would be selected. The absolute parameter is used to ensure that the selected bin size is not too small regardless of the length of the time interval during which query fingerprints are extracted from the query content item. For example, the absolute parameter would ensure that even if the length of the time interval during which query fingerprints are extracted is very small, the selected bin size would be of at least a certain size.

In one embodiment, the bin size is expressed in seconds and is selected as follows. Let $t_{q\_span}$ denote the length, in seconds, of the time interval during which the query fingerprints are extracted from the query content item. Then, a linear parameter may be computed as $$0.004 * t_{q\_span}$$

where "0.004" was determined to be a coefficient that produces a good linear parameter according to this embodiment. This linear parameter indicates that the selected bin size would be at least 0.4% of large time intervals during which query fingerprints are extracted. The absolute parameter may be computed as $$\frac{200.0}{(t_{q\_span} + 100)}$$

where "200.0" and "100" were determined in this embodiment to be coefficients that produce a good absolute parameter. This absolute parameter indicates that even if $t_{q\_span}$ is too small, the bin size would be about two seconds. Based on the above linear and absolute parameters, in this embodiment the bin size may be computed according to the following equation:

$$\text{bin\_size} = 0.004 * t_{q\_span} + \frac{200.0}{(t_{q\_span} + 100)}$$

After the bin size has been selected, in one embodiment the data points may be quantized and counted according to the pseudo code illustrated in Table 1.

TABLE 1

Pseudo Code for Bin Quantizing and Data Point Counting
Pseudo Code: Bin Quantizing and Data Point Counting

```
Inputs: N = number of data points;
        t_offset[ ] - array of time offsets computed for the N data points
        bin_size - the selected or determined bin size (in seconds)
        freq_at[ ] - array storing the bin count for each bin
for (i = 1, i <=N, i++) do
    bin = INT(t_offset[i] / bin_size);
    freq_at[bin]++;
end for
```

In the pseudo code of Table 1, $t_{offset}[i]$ denotes the time offset computed for the $i^{th}$ data point. The quantizing of the data points into discrete bins and the data point counting are performed as follows. Each $t_{offset}[i]$ is first divided by the bin size, and the integer portion of the result is obtained by performing the INT( ) operation on the result of the division. The obtained integer portion is then used as an index into the freq_at[ ] array to increment the count for the bin indicated by that integer portion. In this way, every data point is quantized into a unique discrete integer that indicates a unique discrete bin, and the count for each bin is incremented when a data point is quantized. Then, the position of the maximum value in the freg_at[ ] array would indicate the maximum bin that contains the maximum number of data points.

3.4 Threshold Determination and Trend Detection

To determine whether there is linear trend among a set of data points, the bin-counting mechanism described herein can test whether metrics determined based on the bin count in some bin exceeds a certain threshold. If so, this would indicate a high concentration of data points in that bin, and therefore it would be a good indicator of a linear trend. Thus, the determination of the threshold may govern the accuracy of the bin-counting mechanism. If the threshold is too small, it would lead to false positives in the linear trend detection; if the threshold is too large, it could cause the rejection of what may otherwise be a good linear trend.

In some embodiments, the threshold used in the bin-counting mechanism may include a relative threshold value that is used to test the ratio of maximum count of data points found in a bin to the average count of data points across all bins. In these embodiments, the threshold value may be set to "3.0" and, if the ratio of the maximum bin count to the average bin count exceeds "3.0", the bin counting mechanism may consider that a good linear trend has been detected provided that there are enough data points in the sample (for example, at least 5 total data points and at least 3 data points in the maximum bin).

In addition, or instead of, the threshold used in the bin-counting mechanism may also include both an absolute threshold value and a relative threshold value. The purpose of using both an absolute threshold value and a relative threshold value is to ensure that there is a high concentration of data points in the maximum bin, which may thereafter be used in a subsequent detection pass to determine a more accurate slope. The absolute threshold value may be used to ensure that the detection of linear trend is performed based on at least a certain number of data points. For example, in one embodiment a good value for the absolute threshold has been determined to be at least "5" (e.g., a total number of data points $>=5$). The relative threshold value may be used to increase the accuracy of any detected linear trend by ensuring that at least a certain number of the total data points are located in the maximum bin. For example, in one embodiment a good value for this relative threshold has been determined to be at least "0.15"; this embodiment may test whether the ratio of the maximum count of data points in a bin to the total number of data points exceeds this value (e.g., whether $$\frac{\text{freq\_at[max\_bin]}}{N} \geq 0.15).$$

Thus, when testing against both the absolute threshold value and the relative threshold value, if the total number of data points is greater than or equal to "5" (and the number of data points in the maximum bin is greater than or equal to "3") and the ratio of the maximum bin count to the total number of data points is greater than or equal to "0.15", the bin-counting mechanism may consider that a good linear trend has been detected.

In some embodiments, the one or more relative and/or absolute threshold values included in a threshold may be determined using empirical data and/or probabilistic analysis to ensure a good trade-off between low false-negative rate and low false-positive rate. Further, in some embodiments the threshold values included in a threshold may be determined by taking into account the characteristics of the query content item being identified. Examples of such characteristics include, but are not limited to, the type of content being identified (e.g., audio, video, etc.), the length of the query content item being identified, and the frequency of generating query fingerprints from the query content item.

3.5 Additional Features

In various embodiments, the bin-counting mechanism described herein may use various combinations of bin size selection and threshold determination in order to perform more efficiently and/or to more accurately determine the parameters (e.g., slope and intercept) of the detected linear trends.

For example, in some embodiments instead of applying a linear regression to determine a new slope only when one or more of the determined bin-counting metrics is below a certain threshold, the linear regression may always be performed over the data points in the maximum bin. In these embodiments, after applying the linear regression, the bin-counting mechanism may check whether some data points in the maximum bin are out-liers because, for example, they are located too far from the detected line. The out-lier data points may then be filtered out and the linear regression may be applied again only on the remaining in-lier data points. Once a better estimate of the slope of the linear trend is determined, a smaller bin size and/or a more conservative set of threshold values may be used because a higher concentration of data points (and respectively higher bin count) should be expected in the correct bin, which in turn would lead to a better estimate of the slope value of the actual lienar trend. Doing so would lower the false-positive rate while not increasing the false-negative rate.

4.0 RANSAC-Based Mechanism for Detecting Trends

A traditional RANSAC ("RANdom SAmple Consensus") algorithm randomly picks two sample points and forms a line using these points. If other data points are within a certain distance threshold (denoted D) to the formed line, they are considered as in-lier data points. If the number of the in-lier data points exceeds some threshold, then the line indicated by the in-lier data points is considered a good linear trend. The traditional RANSAC algorithm repeats this process a certain number of times while keeping the best fit result at each iteration, where the "best fit" result maximizes the number of in-lier data points within the current data set. The advantage of the traditional RANSAC algorithm over a least-square based linear regression is its robustness against out-lier data points. Even with only a small fraction of points being in-liers, the RANSAC algorithm would still be able to determine a good linear trend. It is noted, however, that a traditional RANSAC algorithm cannot be readily applied in the context of fingerprinting-based content identification because such content identification may produce very large data sets with a lot of out-lier data points, which in turn would cause a traditional RANSAC algorithm to use a lot of computing resources (e.g., CPU time, memory, etc.) in order to determine the best fitting linear trend.

To apply a RANSAC algorithm efficiently in the context of fingerprinting-based content identification, the techniques described herein provide a RANSAC-based mechanism for detecting trends that includes several novel customizations for the traditional RANSAC algorithm. The RANSAC-based mechanism described herein may detect both linear and non-linear trends. The linear trends detected through the RANSAC-based mechanism are assumed to have an intercept. Such linear trends are sometimes referred to as affine trends that can be fitted to an affine model.

According to the techniques described herein, a RANSAC-based mechanism may use all determined in-lier data points to determine a more accurate trend, as in some traditional RANSAC algorithms. For example, after determining a best-fit line that is associated with a maximum number of in-lier data points (from multiple lines that are identified during multiple iterations of the RANSAC algorithm), the RANSAC-based mechanism described herein may use all of the in-lier data points for the best-fit line in order to determine a more accurate slope for the line. For example, the RANSAC-based mechanism may apply a linear regression or some other type of regression on the group of in-lier data points for the best-fit line in order to obtain the most accurate slope for the line that fits these in-lier data points.

According to the techniques described herein, a RANSAC-based mechanism may augment a traditional RANSAC algorithm to perform one or more post-algorithm steps such as, for example, sorting candidate results by confidence score and/or verifying the final results. To sort the candidate results produced by a traditional RANSAC algorithm, some embodiments provide for computing a confidence value for each detected trend and then multiplying the number of in-lier data points for this trend to the computed confidence value in order to obtain a confidence score. Then, the candidate trends are sorted by their confidence scores, which allows the techniques described herein to efficiently process the candidates by starting with the most likely candidates first. Verification of final results may also be performed in some operational contexts where a wrong result may be obtained when the RANSAC algorithm detects a lot of in-lier data points within a certain small time interval. The techniques described herein provide for final verification of such results because a small query window (even with a high concentration of data points) may not be indicative of a correct result.

In some embodiments, the RANSAC-based mechanism described herein may provide for constraining the distance threshold D that is used by a RANSAC algorithm to determine whether data points are close to a certain formed line or curve. In these embodiments, the distance threshold D may be set to be $1/12$ seconds, which is a good threshold value because normally fingerprints are extracted from the underlying content items at 12 fps rate. Thus, $1/12$ seconds is a good choice for the distance threshold D because it is about the same as any timing error that a fingerprint extraction can introduce.

In some embodiments that are configured to detect linear trends, the RANSAC-based mechanism described herein may provide for constraining any slope value detected by a RANSAC algorithm to be within a certain range. For example, a range of [0.5, 2.5] may be internally built into a traditional RANSAC algorithm. If the RANSAC algorithm detects a slope value outside this range, the slope value is discarded because it almost certainly indicates a wrong identification result. This is because normally a query content item would not play back content that is very slow (e.g., to yield a line having slope less than "0.5") or very fast (e.g., to yield a line having slope greater than "2.5"). Thus, in these embodiments the RANSAC-based mechanism described herein uses a slope range to prevent recognition of certain false linear trends. For example, sometimes the same reference fingerprint may be returned as a match to many different query fingerprints when the overall Bit-Error-Rate (BER) is high. This produces a linear trend of slope "0". However, in the context of fingerprinting-based content identification such linear trend does not indicate an accurate identification result. In accordance with the techniques described herein, the use of a slope range to constrain any detected slope values avoids this problem and improves the accuracy of the RANSAC-based mechanism. In some embodiments, during each iteration the RANSAC-based mechanism described herein may first determine whether the slope value for two randomly selected data points is within a certain slope range, but without determining how many other data points are in-lier data points with respect to the line having the determined slope value. Then, if the determined slope value is not within the certain slope range, the RANSAC-based mechanism foregoes any processing based on that slope value such as determining any potential in-lier data points. In this way, the RANSAC-based mechanism described herein can perform a lot faster than traditional RANSAC processing especially when the underlying data includes a lot of noise. It is noted that, in embodiments that provide for detecting non-linear trends, the RANSAC-based mechanism described herein may provide for constraining the coefficients of the underlying non-linear models within certain coefficient ranges in a manner that is similar to the above-described use of the slope range to constrain the slope value obtained for a linear trend that is detected based on a linear model.

It is noted that different embodiments may use different ranges to constrain the coefficient values detected by a RANSAC algorithm for linear or non-linear trends, and such coefficient ranges may be determined based on various parameters including, but not limited to, the type of content being searched (e.g., audio or video content), the length of the query content item being identified, and the play-back rate of the query content item. For example, in some embodiments the parameters determining the coefficient range(s) may indicate how the query content is anticipated to have been changed, and these parameters may be dynamically configured by a user.

4.1 Selecting a Model to Match

As used herein, "model" refers to a type of a trend against which query results for a query content item are to be matched. According to the techniques described herein, in some embodiments the RANSAC-based mechanism is operable to fit the underlying query results to several different models. Examples of such models include, without limitation, linear models that are assumed to have an intercept (e.g., affine models) and non-linear models that represent a curved line of some kind. Thus, if a linear model is selected, then the RANSAC-based mechanism will try to match the underlying query results against a line in order to determine whether the query results exhibit a linear trend. If a non-linear model is selected, then the RANSAC-based mechanism will try to match the underlying query results against a non-linear curve in order to determine whether the query results exhibit a non-linear trend.

A model is associated with and prescribes one or more coefficients. The values of the coefficients of a model are determined when query results of fingerprint queries for a query content item are fitted to the model by applying the RANSAC-based mechanism described herein. For example, one of the coefficients in a linear model is a slope; when the RANSAC-based mechanism is applied to detect a linear trend, the value of the slope of the linear trend is determined. In another example, a non-linear model may be associated with multiple coefficients depending on the particular type of the model; when the RANSAC-based mechanism is applied to detect a non-linear trend, the values of these coefficients are determined.

In some embodiments, the RANSAC-based mechanism described herein allows a user to select a particular model (e.g., a linear model or some specific non-linear model) against which the underlying query results are going to be matched. The RANSAC-based algorithm then examines, and tries to match, the underlying query results against the selected model. For example, a search engine or a component thereof may provide a user interface through which a user can enter or select one of multiple available models against which the search engine can match the results returned from fingerprint queries that are generated from a query content item. After the user provides input selecting a particular model, the search engine or a component thereof applies a RANSAC algorithm to fit the query results against the selected model in accordance with the RANSAC-based mechanism described herein.

In some embodiments, the RANSAC-based mechanism described herein may automatically select a particular model against which the underlying query results are going to be matched. For example, a search engine or a component thereof may use some heuristics or other selection techniques to select a model from multiple models that are configured for the search engine, and may then examine and try to match the query results against the selected model.

In some embodiments, the RANSAC-based mechanism described herein may allow a user to select a default model that will be applied against query content items that come from a particular source. For example, a search engine may provide the user with an interface through which the user may initially select a default model. The search engine may then apply the RANSAC-based mechanism by using the default model to initially match the underlying query results for a particular query content item. If the RANSAC-based mechanism does not detect any trends (e.g., linear trends if default model is linear) in the underlying query results, then the search engine may prompt the user to select some other model (e.g., one of multiple available non-linear models) against which to attempt to match the query results. In this manner, these embodiments allow a user to select and test various models against the query results for the query content item. This may be particularly useful when query content items coming from a particular source (e.g., a repository of potentially copyright-infringing videos) are encoded according to some encoding that is not initially known to the user of the search engine. Thus, by selecting from multiple available models, the user may use the search engine to determine a model that corresponds to the encoding, and may then set this model as a default when trying to match content items coming from that repository.

In some embodiments, the RANSAC-based mechanism described herein may automatically select and use a default model against which the underlying query results are going to be matched. If the selected default model does not match the query results, then a user may be presented with a set of choices from which to select another model, different from the default, against which to try to match the query results. For example, a search engine may by default apply the RANSAC-based mechanism by using a linear model to initially match the underlying query results. If the RANSAC-based mechanism does not detect any linear trends in the underlying query results, then the search engine may prompt the user to select some other model (e.g., one of multiple available non-linear models) against which to attempt to match the query results. In these embodiments, the use of a default model in combination with user-selectable models would speed up the identification of a matching content item, especially when the user has initially no idea of the exact type of modification that may have been performed on the query content item that needs to be identified.

4.2 Example Non-Linear Trends

In some embodiments, the RANSAC-based mechanism described herein is operable to match the results of fingerprint queries for a query content item against a non-linear model that represents a two-dimensional curve other than a straight line.

In the context of fingerprint identification, a set of query results exhibiting a non-linear trend means that the playback speed of the query content item being identified is not constant but is fluctuating (e.g., some portions of the content item would play faster than other portions). For example, an encoding of the query content item may deliberately use a fluctuating playback speed in accordance with a non-linear model, and the inverse non-linear model (known to the infringer but not to the search engine user) may be applied during decoding/playback in order to make the identification of the content item mode difficult.

In some embodiments, the RANSAC-based mechanism described herein may be operable to fit query results for query content items against non-linear models that represent various non-linear curves. For example, the non-linear models may be expressed as polynomials of different orders (with the order >1), where a polynomial is an empirical representation of a two-dimensional curved line. (For instance, a polynomial of the $2^{nd}$ order represents parabola.) In another example, a non-linear model may represent a curve that is created by modulating a periodic non-linear curve on top of a linear model. Such curve may look like a sine wave, except that it would have an overall linear trend that is pointing upward. It is noted that the techniques described herein are not limited to using non-linear trends of any particular kind or any particular order. Rather, different embodiments may use as non-linear models polynomials of various orders for achieving greater content identification accuracy, where the order of the selected polynomial may be adjusted (e.g., dynamically or in response to user input) in order to account for noise in the underlying data and/or for faster processing.

4.3 Example RANSAC-Based Method for Detecting Linear Trends

Figure 4A:
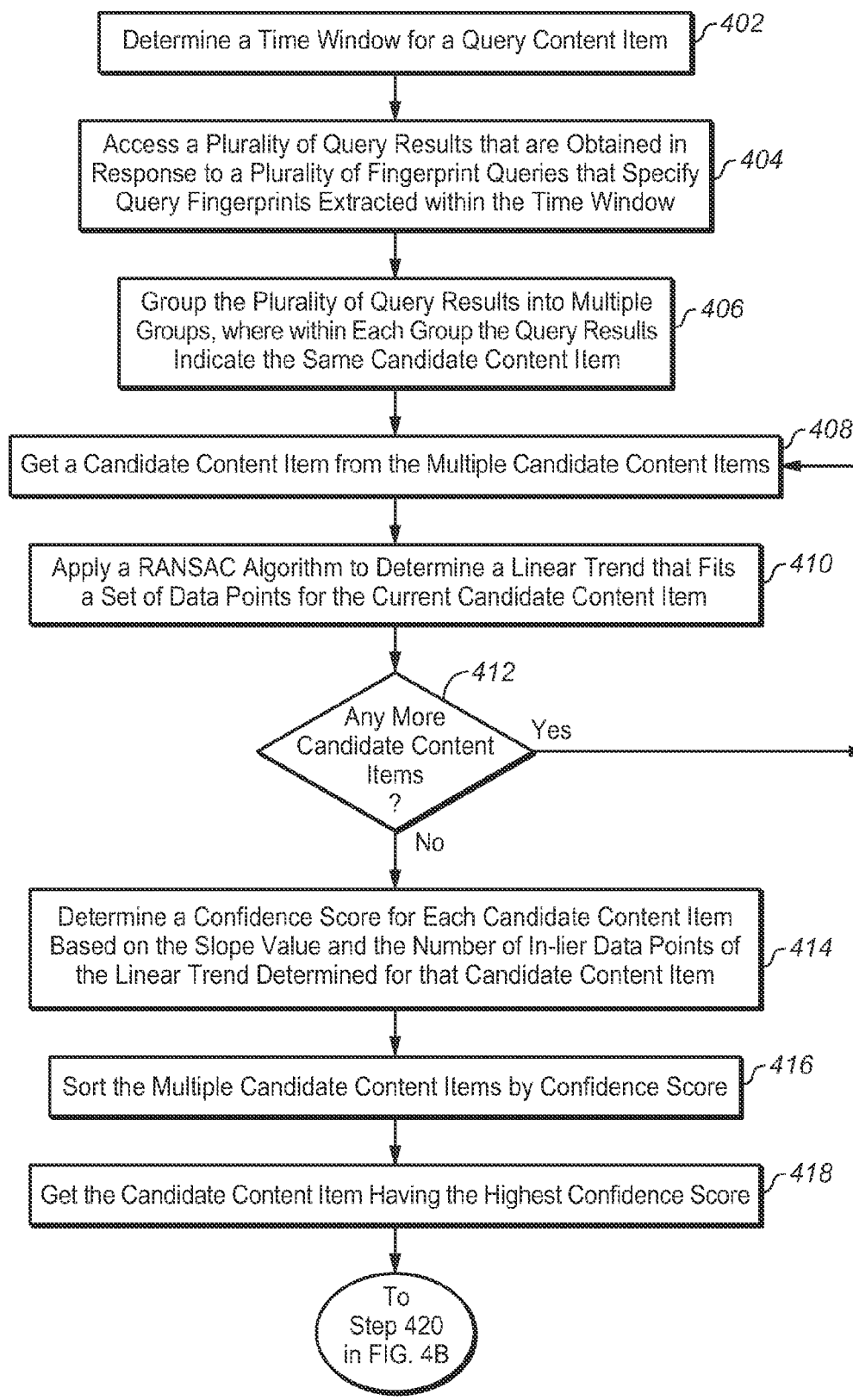
FIG. 4A and FIG. 4B are flow diagrams that collectively illustrate a RANSAC-based mechanism for detecting linear trends in fingerprinting-based content identification according to an example embodiment.
Figure 4B:
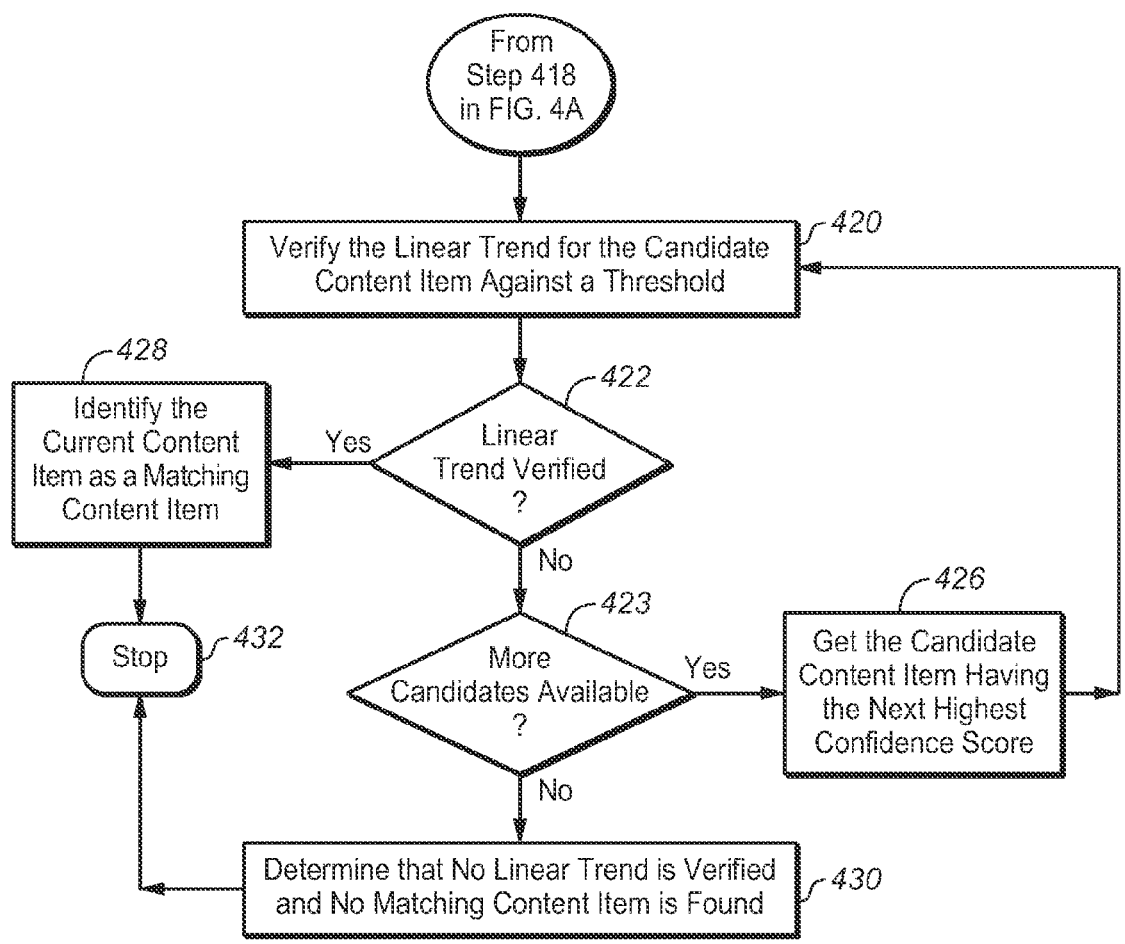

FIGS. 4A and 4B are flow diagrams that collectively illustrate an example RANSAC-based mechanism for detecting linear trends in fingerprinting-based content identification. The RANSAC-based mechanism illustrated in FIGS. 4A and 4B is operable to detect a linear trend by trying to fit fingerprint query results against a linear model.

The RANSAC-based mechanism may be implemented by a variety of software components and in a variety of operational contexts. For example, in one operational context, the steps of the method in FIGS. 4A and 4B may be performed by one or more modules of a search engine, such as search engine 102 in FIG. 1. For illustration purposes only, the steps of the method illustrated in FIGS. 4A and 4B are described hereinafter as being performed by a search engine; however, it is noted that in various embodiments and operational contexts the steps of the method in FIGS. 4A and 4B may be performed by software and/or hardware components other than a search engine.

Referring to FIG. 4A, in step 402 a search engine or a component thereof determines a time window for a query content item. As used herein, "time window" relates to a time interval during which fingerprints are extracted or otherwise generated from a query content item. For example, if the search engine operates offline to identify discrete query content items against a fingerprint database, the search engine or the component thereof may select as the time window the entire length of a query content item that is being identified. If the search engine operates online to process a stream that contains the query content item, the search engine may use an adaptive algorithm to incrementally update the time window for the query content item until a matching reference content item is found or until processing of the stream is completed.

In step 404, the search engine or a component thereof accesses a plurality of query results that are obtained in response to a plurality of fingerprint queries that specify query fingerprints that are extracted within the time window from a query content item.

In step 406, the search engine or a component thereof groups the query results into multiple groups by content identifier, where the subset of query results within a given group indicate the same content identifier for the same candidate content item. As used herein, "candidate content item" relates to a reference content item that is associated with one or more reference fingerprints and that may potentially be an accurate match to a given query content item. A query result may include a matching reference fingerprint and a content identifier associated with the reference fingerprint, where the content identifier identifies a reference content item that is considered by the RANSAC-based mechanism described herein as a candidate content item for the purposes of further processing.

In step 408 to step 412, the search engine or a component thereof processes the query results in each separate group to determine a linear trend that fits a set of data points generated for that group. For example, in step 408 the search engine or a component thereof selects the query results included in a particular group and generates a set of data points based on the query fingerprints and the matching reference fingerprints included in the query results. In step 410, a RANSAC algorithm is applied to the set of generated data points. When applied, the RANSAC algorithm returns the parameters of a linear trend (e.g., a slope, a number of in-lier data points, and/or an intercept) that best fits the set of data points. In some embodiments, the RANSAC-based mechanism described herein may constrain the distance threshold D that is used by the RANSAC algorithm to determine the in-lier data points that are close to the detected line; for example, the distance threshold D may be set to $\frac{1}{12}$ seconds. In some embodiments, the RANSAC-based mechanism described herein may constrain any slope value detected by the RANSAC algorithm to be within a certain range, for example the range of [0.5, 2.5]. In these embodiments, if the slope value determined from a pair of data points is outside the slope range, the RANSAC-based mechanism would discard the iteration involving this pair of data points, and would continue with a next iteration by selecting another pair of points from the current set of data points. If the data points in the current set of data points do not yield a slope value within the slope range, the RANSAC-based mechanism would forego any further processing of the candidate content item associated with that set of data points. In step 412, the search engine or the component thereof determines whether there are any more candidate content items to process. If there are more candidate content items to process, the search engine or the component thereof proceeds with step 408 to process the next candidate content item. If in step 412 the search engine or the component thereof determines that the RANSAC algorithm has been applied to the data points associated with each candidate content item, the search engine proceeds with step 414 to compute a confidence score for each candidate content item.

In step 414, the search engine or a component thereof computes a confidence score for each individual candidate content item based on the slope value of the linear trend detected for that individual content item and the number of in-lier data points that fit the detected linear trend. As used herein, "confidence score" relates to a metric that indicates the likelihood of a linear trend of indicating that a candidate content item, which is associated with the linear trend, correctly identifies a given query content item.

In step 416, the search engine or a component thereof sorts the candidate content items according to their respective confidence scores, and in step 418 through step 430 the candidate content items are processed one-by-one starting with the candidate content item that has the highest confidence score. The sorting and processing of candidate content items by confidence score allows the RANSAC-based mechanism described herein to process the candidate content items in order from the most likely to the least likely candidate content item. This confidence-score-based processing is markedly different from prior approaches, which use a majority operation to determine the candidate content item that is most frequently found in the query results and use that candidate content item as the final result. In such prior approaches, the use of a majority operation may yield a wrong result, especially if there is a lot of noise and a lot of out-liers in the query results.

In contrast, according to the RANSAC-based mechanism described herein, in step 418 the search engine or a component thereof selects for processing the candidate content item with the highest confidence score first, and in step 420 of FIG. 4B the search engine or the component thereof verifies the linear trend for that candidate content item against a threshold.

Referring to FIG. 4B, if in step 422 the search engine or the component thereof determines that the linear trend for the current candidate content item satisfies the threshold, then in step 428 the search engine determines that the current candidate content item is a matching content item, and in step 432 the search engine stops the identification process and foregoes the processing of the remaining candidate content items.

If in step 422 the search engine or the component thereof determines that the linear trend for the current candidate content item does not satisfy the threshold, then in step 423 the search engine or the component thereof determines whether there are any linear trends of candidate content items remaining for verification. If in step 423 the search engine or the component thereof determines that no linear trends remain for verification, then in step 430 the search engine or the component thereof determines that no linear trends have been verified and thus no matching content item has been found, and in step 432 the search engine stops the identification process. If in step 423 the search engine or the component thereof determines that the linear trends of one or more candidate content items remain for verification, then in step 426 the search engine or the component thereof select for processing the candidate content item having the next highest confidence score, and repeats step 420 through step 432 for that candidate content item.

In this manner, the RANSAC-based mechanism described herein processes the candidate content items in order of decreasing confidence score, and foregoes the processing of any remaining candidate content items once it finds a candidate content item that is associated with a linear trend that satisfies the pre-set threshold.

4.4 Time Window Determination

The RANSAC-based mechanism described herein may be implemented to operate in offline mode as well as in online mode. In offline mode, the time window during which fingerprints are extracted from a query content item may be selected as the time length of the entire query content item or as the time length of one or more portions thereof.

In online mode, the RANSAC-based mechanism described herein may use an adaptive algorithm to dynamically determine the time window for a query content item that is provided or accessed in a streaming manner. For example, in one embodiment the following adaptive algorithm may be used to dynamically determine the time window for a query content item that is being streamed. Let $T_{query\_length}$ be the length of the query content item, $T_{window}$ be the current time window from which query fingerprints are extracted, $T_{step\_window}$ be the step (or increment) to $T_{window}$, and $T_{base\_window}$ be the base window size (e.g., the time duration of a fingerprint). In addition, let $MAX\_N_{inlier}(n)$ be the maximum number of in-lier data points among all candidate content items in the $n^{th}$ pass of linear trend detection, and let $MAX\_N_{inlier}(0)=0$. Initially, $T_{window}$, $T_{step\_window}$, and $T_{base\_window}$ are set to equal the same value, e.g., $T_{window}=T_{step\_window}=T_{base\_window}$. The pseudo code of the adaptive algorithm for determining the time window is illustrated in Table 2.

TABLE 2

Pseudo Code for Determining a Time Window in Online Mode
Pseudo Code: Determining a Time Window in Online Mode while ($T_{window} \leq T_{query\_length}$)
    do linear trend analysis using fingerprint(s) within $T_{window}$
        if the linear trend for one candidate content item is verified
            break;
        Else
            $MAX\_N_{inlier}(n)$ = maximum number of inliers among all candidates in the current pass
            if $MAX\_N_{inlier}(n) > MAX\_N_{inlier}(n-1)$
                $T_{step\_window} = T_{base\_window}$
            else
                $T_{step\_window} = T_{step\_window} * 2$
            end if
        $T_{window} = T_{window} + T_{step\_window}$
        $T_{window} = \min(T_{window}, T_{query\_length})$
        n++
    end if
end while In some embodiments, the time window for a query content item that is being streamed may be updated dynamically by using variable-length increments based on the likelihood of detecting linear trends within one or more previous time windows. For example, the variable-length increments may be increased proportionally (rather than being fixed) when the likelihood of detecting a linear trend has decreased from a previous iteration that used data points extracted from a previous time window. The likelihood of detecting a linear trend can be determined based on an inliers-per-second metric that represents the number of normalized in-lier data points per second.

4.5 Grouping, Sorting, and Selection of Candidates

According to the RANSAC-based mechanism described herein, query fingerprints are extracted or otherwise generated from a query content item for which identification needs to be performed. A fingerprint database is then searched to find reference fingerprints that match the extracted query fingerprints, where the reference fingerprints may be associated with different content identifiers (e.g., filenames, content item titles, etc.) that identify different reference content items. For example, a set of fingerprint queries may be generated for the query fingerprints, and the set of fingerprint queries may be executed against the fingerprint database. A query result may include a matching reference fingerprint and a content identifier associated with the reference fingerprint, where the content identifier identifies a reference content item that may be considered by the RANSAC-based mechanism described herein as a candidate content item for the purposes of further processing.

The returned query results are then grouped into separate groups by content identifier, where the subset of query results within each group indicate the same content identifier for the same candidate content item. In some embodiments, the groups may be further sorted by the frequency with which the candidate content items are present in each group.

To improve the processing efficiency, in some embodiments only some of the candidate content items, but not all, may be selected for further processing based on their frequency of appearance in the query results. For example, if MAX_F is used to denote the highest matching frequency among all candidate content items, then only candidate content items with matching frequency bigger than $$\frac{MAX\_F}{10}$$

(e.g., the top 10%) may be selected for further processing. If more than 20 candidate content items satisfy this condition, then only the top 20 may be selected for further processing. It is noted that various embodiments may use various rules and constraints to limit the number of candidate content items for further processing, and for this reason the example rules described in this paragraph are to be considered in an illustrative rather than a restrictive sense.

4.6 Fitting a Linear Trend by Using RANSAC

According to the RANSAC-based mechanism described herein, a set of data points is generated for the candidate content item in each group. For example, a set of data points may be generated based on the time locations of the query fingerprints in the query content item and the time locations of the correspondingly matching reference fingerprints in the candidate content item represented in each group.

Figure 5A:
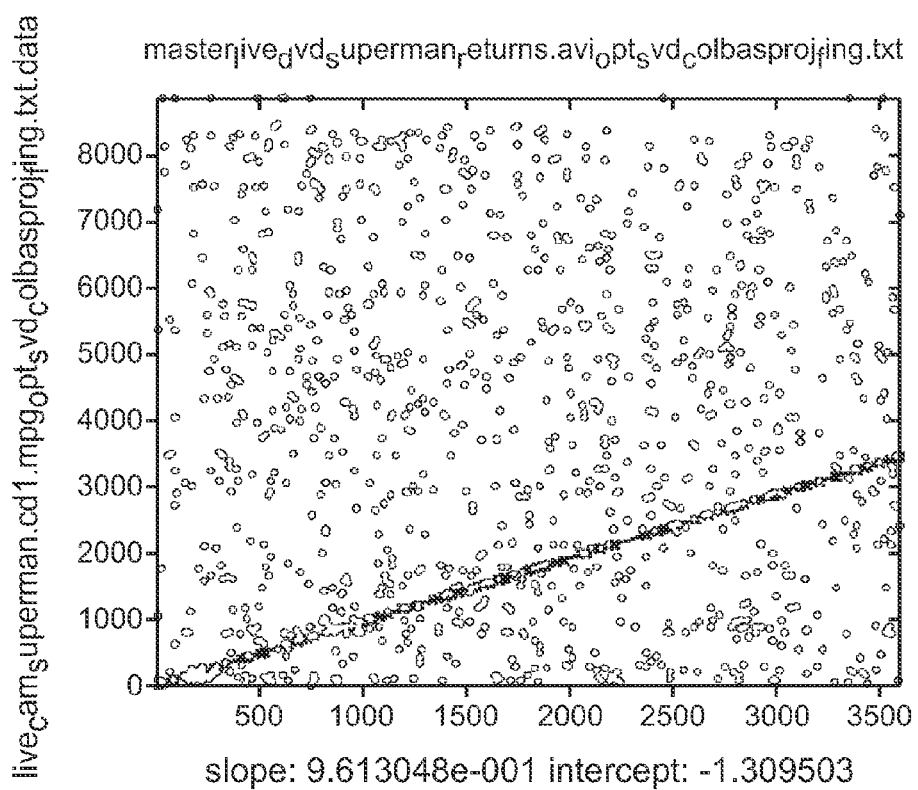
FIG. 5A illustrates a graph of a matching result from an example application of a RANSAC-based mechanism according to one embodiment.

A RANSAC algorithm is then applied separately to the set of data points in each group to determine a linear trend that is associated with the candidate content item represented in that group. FIG. 5A illustrates a graph of an example linear trend that may be determined by applying a RANSAC algorithm in accordance with the techniques described herein.

In various embodiments, the RANSAC algorithm being applied may be modified in accordance with the techniques described herein in order to perform efficiently in the context of fingerprinting-based content identification. For example, a traditional RANSAC algorithm may be customized by modifying various parameters including, but not limited to, parameters defining with the linear model, parameters determining the number of iterations, and parameters defining the tolerance for in-lier data points.

Linear Model Parameters.

When applied, a RANSAC algorithm would find a linear trend with the maximum number of in-lier data points. However, in the context of fingerprinting-based content identification, only linear trends having a slope within a certain range need to be considered. In some embodiments, the slope range may be set as [0.5, 2.5], and a RANSAC algorithm may be modified to find only linear trends that have slope values within this range and that have the maximum number of in-lier data points respective to these trends.

Number of Iterations.

Let p denote the proportion of the in-lier data points against the total number of data points, and n denote the number of iterations (e.g., the number of times) the RANSAC algorithm picks two data points at random and fits a line through them.

After n iterations, the probability P that a good linear trend is never determined is $$P=(1-p^2)^n$$

and thus $$n = \frac{\log(P)}{\log(1-p^2)}$$

For example, if the values of P and p are selected as follows:

$$P=10^{-6}, p=0.06$$

then $$n=\log(10^{-6})/\log(1-0.06^2)=3830.7$$

where n=3830.7 indicates the number of iterations after which the probability of finding a good linear trend, having 6% (0.06) of in-lier data points, drops below 0.0001% (e.g. $10^{-6}$). Based on the above analysis, in one embodiment the number of iterations applied by the RANSAC algorithm may be selected as n=4000.

When a non-linear model represented by an order-m polynomial is selected for use in the RANSAC algorithm, it would take m+1 data points to fit a trend during each iteration of the algorithm. Thus, after n iterations, the probability P that a good non-linear trend is never determined is $$P=(1-p^{m+1})^n$$

and thus $$n = \frac{\log(P)}{\log(1-p^{m+1})}$$

Based on this analysis, in one embodiment the number of iterations n to be applied by the RANSAC algorithm for a non-linear model of order m may be determined according to the above empirical formula.

Tolerance for in-Lier Data Points.

For a linear model, when the RANSAC algorithm picks a line through two randomly selected data points, the RANSAC algorithm needs to count the number of in-lier data points that support (e.g., are close) to that line. To determine whether a data point is an in-lier or an out-lier with respect to a line, distance measurement from the data point to the line is required. The distance measurement for a data point is computed as follows. Let $$ax+by+c=0$$

be the line given by two data points in a certain iteration. Then, for each of the remaining data points $(x_q, y_r)$ in the set of data point on which the RANSAC algorithm is applied, the distance measurement d is computed as $$d = \left| \frac{ax_q + by_r + c}{\sqrt{a^2 + b^2}} \right|$$

If $d \leq D$, where D is a pre-defined distance tolerance threshold for in-liers, then data point $x_q, y_r$) is counted as an in-lier. Otherwise, when $d > D$, the data point $(x_q, y_r)$ is an out-lier. Based on the above analysis, in some embodiments the distance tolerance threshold D is selected to be 1/12 seconds, which is the time interval between two consecutive frames at the 12 fps nominal fingerprint extraction rate.

4.7 Confidence Score Determination

When the RANSAC-based mechanism described herein is applied for a linear model, a confidence score may be computed for each candidate content item after the linear trend for each candidate content item is determined. For example, the confidence score for a candidate content item may computed as the multiplicative product of the number of in-lier data points for the linear trend determined for that candidate content item and a confidence value based on the slope of the determined linear trend.

Figure 5B:
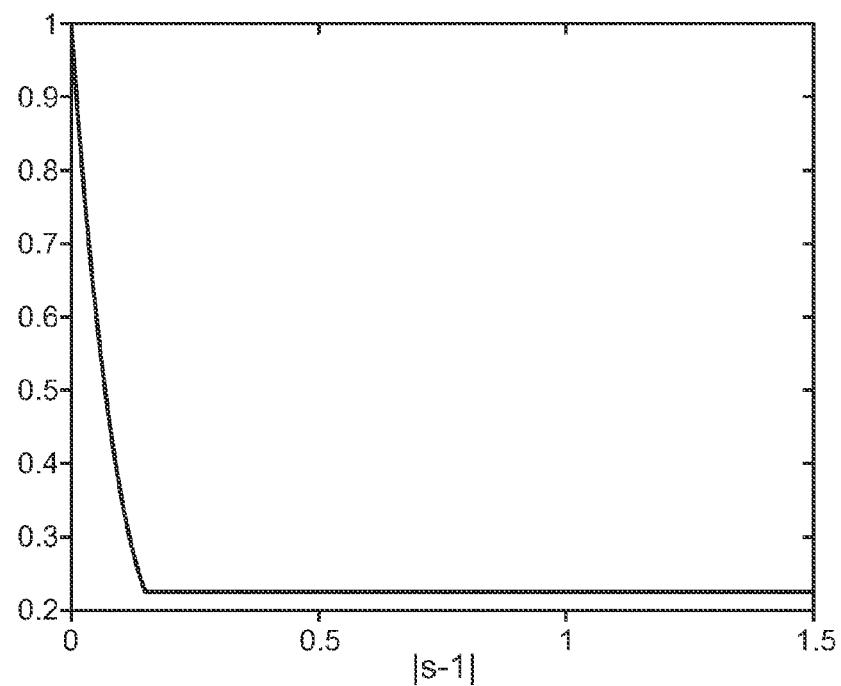
FIG. 5B illustrates a graph of a slope function that may be used in computing confidence scores of a RANSAC-based mechanism according to one embodiment.

After a RANSAC algorithm is applied to the set of data points in each group, a linear trend is determined for each candidate content item and is characterized by a slope value and a number of in-liers data points that fit that linear trend. In some embodiments, a confidence score for each candidate content item may be determined as follows. Let k be the slope determined for a linear trend, and $N_{inlier}$ be the number of in-lier data points that fit that linear trend. Then, the following empirical formula may be used to determine the confidence score:

$$S=N_{inlier}*\max(e^{-10*|k-1|}, e^{-10*0.15})$$

where S is the computed confidence score for the candidate content item and $\max(e^{-10*|k-1|}, e^{-10*0.15})$ is a confidence value function that ranges from a maximum of about "1.0" and a minimum of about "0.23" depending on the slope k of the determined linear trend. FIG. 5B illustrates a graph of this confidence value function according to these embodiments. It is noted that a modified RANSAC algorithm may be used in some embodiments, in which during each RANSAC iteration the modified RANSAC algorithm may compute the confidence score along with the slope k and may then consider the computed confidence score in determining whether the slope k is likely to be accurate. This gives more precedence to a slope closer to "1.0" if there are multiple linear trends with different slopes for a given candidate content item.

After the confidence score for each candidate content item is computed, the candidate content items are sorted based on their confidence score for the purpose of performing a final verification.

4.8 Final Verification

When the RANSAC-based mechanism described herein is applied for a linear model, a final verification is performed for the candidate content items one by one in order of decreasing confidence score. If the linear trend for one candidate content item satisfies a certain pre-set threshold, that candidate content item is considered as a matching result and the linear trends for the remaining candidate content items are not verified.

The final verification of each linear trend includes comparing, to one or more threshold values, one or more metrics that are derived from parameters associated with that linear trend. The final verification of each linear trend may be needed because a wrong result (e.g., the wrong reference content item being identified as a matching content item) may be obtained when a small time interval includes a lot of data points, even when the modified RANSAC algorithm described herein indicates a lot of in-lier data points. This is because a small query time interval (even with a high concentration of data points) may not be indicative of a correct result. In general, a larger query time interval is more reliable, and the final verification described herein deals with the problem posed by small query intervals.

In some embodiments, the final verification may be based on the normalized number of in-lier data points for the linear trend determined for each candidate content item. To perform the final verification, the RANSAC-based mechanism described herein may first divide the query time interval into multiple time segments. Then, for a given candidate content item, the RANSAC-based mechanism determines whether there is at least one in-lier data point within each time segment. A time segment with at least one in-lier data point is marked as in-lier segment. Then, the normalized number of in-lier data points indicates how many time segments have in-lier data points, and this result is compared to a pre-set threshold in order to determine whether the linear trend indicates a matching content item with the accuracy indicated in the threshold.

For example, let $T_{query\_length}$ be the length of the underlying query content item. $T_{query\_length}$ is first quantized into time segments each of which is 5/12 seconds long (e.g., includes 5 codewords). Then a search is performed at least once every 5/12 seconds for segments that are 5/12 seconds long. Then a count is taken of how many time segments have at least one in-lier data point that falls into them. If this count of in-lier time segments for a given candidate content item is higher than a pre-set threshold value (denoted Threshold_Inliers), and the density of the in-lier data points (e.g., in-lier data points per second) is also higher than another pre-set threshold value (denoted Threshold_Density), then the candidate content item is determined to pass the final verification.

In some embodiments, the threshold values in the final verification may be selected as follows:

$$Threshold\_Inliers=6, Threshold\_Density=3\times10^{-3}$$

In these embodiments, the threshold density may be set so low in order to detect very weak linear trends. It is noted, however, that the threshold density may be adjusted to suit different data sets and different operational contexts. For example, in order to better deal with short query content items, in some embodiments the threshold values in the final verification may be selected as follows:

$$Threshold\_Inliers=4, Threshold\_Density=1$$

In these embodiments, the threshold density may be computed by using the time length of the query content item and may thus be stricter.

4.9 Detecting Non-Linear Trends by Using RANSAC

According to the techniques described herein, using a RANSAC algorithm to fit the results of fingerprint queries against non-linear models is performed in a manner similar to using a RANSAC algorithm to fit query results against linear models. For example, the RANSAC-based mechanism described herein is operable to use a confidence score in order to determine the best non-linear trend that fits the underlying query results and correspondingly identifies a matching content item, where the confidence score is driven by the number of in-lier data points and how close the obtained coefficients of the model are to their most commonly occurring values, just like how close the obtained slope value is to its most common value of "1.0" for a linear model. Similarly, the RANSAC-based mechanism described herein is operable to use range(s) for the values of one or more coefficients of a non-linear model to restrict the non-linear curves that are identified during each iteration of the RANSAC algorithm, thus increasing the accuracy and processing speed of the mechanism in identifying the best matching content item. The RANSAC-based mechanism described herein is also operable to use thresholds of absolute and/or relative density of in-lier data points for non-linear curves in a similar manner as the thresholds described herein for linear trends.

5.0 Ranking-Based Mechanism for Content Identification

The techniques described herein provide a ranking-based mechanism that is operable to identify duplicate or multiple reference content items that all match a given query content item. Generally, fingerprinting-based content identification approaches return, for each query fingerprint, a "best" match that the search algorithm can find within a reasonable amount of time, where the "best" match is that one reference fingerprint from across the entire fingerprint database which most closely matches the query fingerprint. Then, the results from a number of query fingerprint searches are combined by content identifier (e.g., a filename or content title) and additional algorithms are applied to determine the most accurately matching reference content item.

However, a difficulty remains when duplicate content items are represented by reference fingerprints in the fingerprint database. For example, if a fingerprint database stores reference fingerprints for two different instances of the same movie, and the two instances are nearly the same with respect to ratio, letter box size, picture quality, etc., then the best match for a query content item from this movie may either return the first instance (e.g., if the reference fingerprints from the first instance have a higher priority in the fingerprint database) or return one of the two instances in an arbitrary and unpredictable manner. In the first case, the user would not be aware of the existence of a duplicate or nearly duplicate instance of the movie in the fingerprint database. In the second case, the user would get arbitrary results (e.g., the returned results are said to "oscillate").

Duplicate or nearly duplicate instances of the same content sometimes occur because the same content may be released as separate versions and/or in separate releases. For example, the same song (in case of audio fingerprinting) can appear as slightly different versions in various album releases, or it could appear in an original album and then re-appear as part of a "Greatest Hits" album. Further, in some operational contexts there may be additional reasons to keep duplicate content represented in the same fingerprint database. For example, a short scene from one episode of a TV series may be replayed as a re-cap from another episode. In such cases, it may be desirable to keep both versions represented in the fingerprint database when the database is used to detect unauthorized use.

To address the difficulties posed by duplicate content that is represented in the same fingerprint database, the techniques described herein provide a ranking-based mechanism that may employ the bin-counting or RANSAC-based trend detection mechanism described herein.

Instead of returning a "best" match, the ranking-based mechanism described herein returns up to the top-K "best" reference fingerprint matches for each query fingerprint, where K can be a fixed constant (e.g., "3"). If there are less than K matches returned for a particular query fingerprint, then all available reference fingerprints that match may be returned. Then, all K reference fingerprints that match (as opposed to a single "best" match) are used to generate the set of data points that are provided to a trend detection mechanism. During trend detection, the set of data points may be sorted by their associated content identifiers (e.g., filenames or content titles), and then a trend detection mechanism (e.g., a bin-counting or a RANSAC-based mechanism) may be applied to each subset of data points that are associated with the same content identifier.

It is noted that according to the ranking-based mechanism described herein, the trend detection is not stopped as soon as an acceptable reference content item is determined. Rather, since the goal is to identify the existence of duplicate reference content items, the ranking-based mechanism described herein would continue to detect trends for at least some of the remaining reference content items. If many candidate content items are identified in the fingerprint search results, the ranking-based mechanism may stop after detecting the trends for all remaining candidate content items, but for best performance it should not stop before detecting some number (e.g., K) of acceptable reference content items. The rationale is that since the ranking-based mechanism returns up to the top-K matches per query fingerprint search, it is likely that only up to K instances of duplicate reference content items can be detected.

Figure 6A:
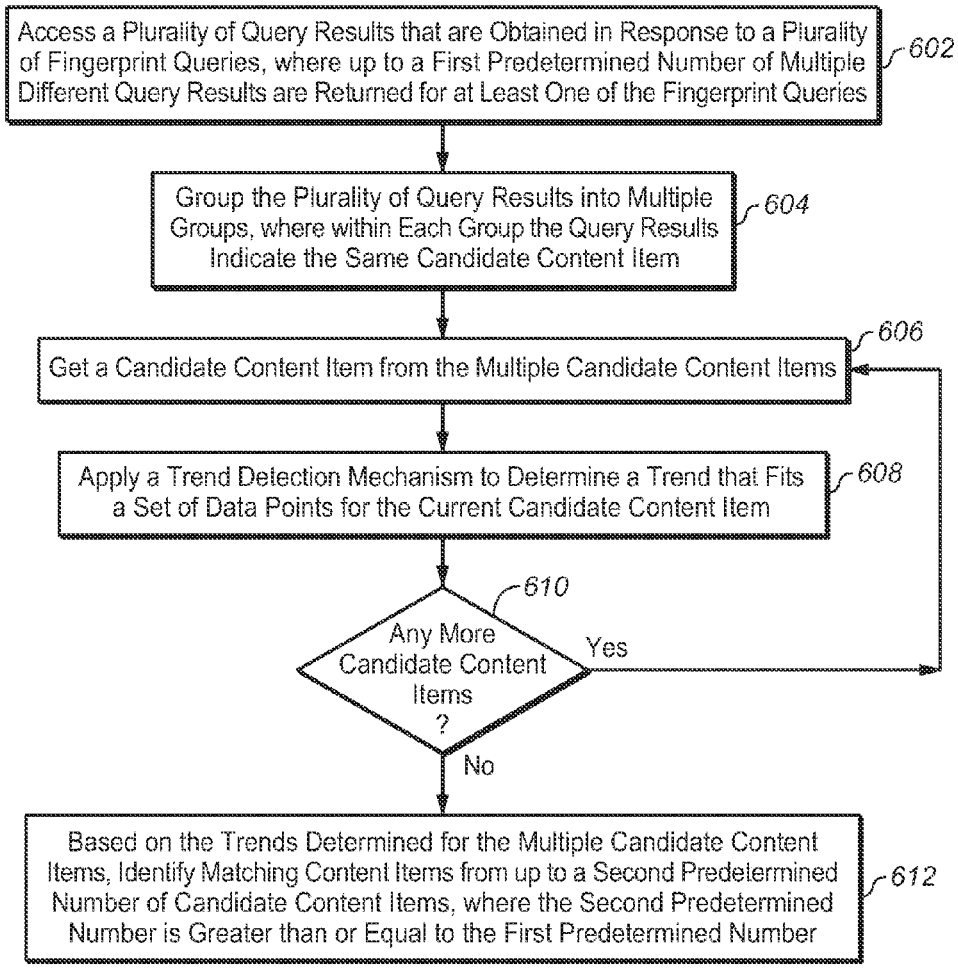
FIG. 6A is a flow diagram that illustrates a ranking-based mechanism for fingerprinting-based content identification according to an example embodiment.

FIG. 6A is a flow diagram that illustrates a ranking-based mechanism for fingerprinting-based content identification according to an example embodiment. The ranking-based mechanism may be implemented by a variety of software components and in a variety of operational contexts. For example, in one operational context, the steps of the method in FIG. 6A may be performed by one or more modules of a search engine, such as search engine 102 in FIG. 1. For illustration purposes only, the steps of the method illustrated in FIG. 6A are described hereinafter as being performed by a search engine; however, it is noted that in various embodiments and operational contexts the steps of the method in FIG. 6A may be performed by software and/or hardware components other than a search engine.

In step 602, a search engine or a component thereof obtains or otherwise accesses a plurality of query results that are returned in response to a plurality of fingerprint queries that are generated for a query content item. The query results include a first fixed number (e.g., K, where K>1) of multiple different query results that are returned for at least one of the fingerprint queries. For example, for the same query fingerprint, the query results may include K different reference fingerprints that are associated with K different content identifiers that identify K different candidate content items.

In step 604, the search engine or a component thereof groups the query results, including the multiple different query results for the same fingerprint query, into multiple groups by content identifier, where the subset of query results within a given group indicate the same content identifier for the same candidate content item. For example, all query results in group "1" indicate content identifier "1", all query results in group "2" indicate content identifier "2", etc. Thus, the multiple different query results for the same fingerprint query would be included in separate and different groups, which may or may not include query results for other fingerprint queries.

In step 606 to step 610, the search engine or a component thereof applies a trend detection mechanism separately to each candidate content item that is identified in the separate groups. The trend detection mechanism may be the bin-counting or RANSAC-based mechanism described herein, or it may be any other now known or later developed trend detection mechanism. For example, in step 606 the search engine or the component thereof may select a candidate content item from the candidate content items that are identified in the groups. The search engine or the component thereof may select the query results included in a particular group and may generate a set of data points based on the query fingerprints and the matching reference fingerprints included in the query results. In step 608, a trend detection mechanism is applied to the set of generated data points. When applied, the trend detection mechanism returns the parameters of a trend (e.g., a slope for a linear trend, a number of in-lier data points, and/or an intercept) that best fits the set of data points.

In step 610, the search engine or the component thereof determines whether there are any more candidate content items to process. If there are more candidate content items to process, the search engine or the component thereof proceeds with step 606 to select and process the next candidate content item. If in step 610 the search engine or the component thereof determines that there are no more candidate content items that should be processed, the search engine proceeds with step 612.

In step 612, based on the trends determined for the candidate content items, the search engine or a component thereof identifies matching content items that match the query content item from up to a number (e.g., N) of candidate content items. The number of candidate content items that can potentially match the query content item is greater than or equal to the number of multiple different query results that can be returned for the same fingerprint query—in other words, N≥K where N is the number of the candidate content items from which matching content items are identified and K is the number of multiple different query results that can be returned for same fingerprint query. It is noted that in different embodiments and in different operational contexts, the parameters N and K may be set to any suitable values. For example, the parameters N and K may be determined based on various parameters including, but not limited to, the type (e.g., audio or video) of content that is being identified, the type and/or size of the fingerprint database, and the anticipated number and/or format of the duplicate content in the fingerprint database. Further, in some embodiments the parameters N and K may be dynamically set by a user (e.g., for each individual query content item or for each type of query content item), while in other embodiments the parameters N and K may be pre-configured for or automatically determined by the search engine.

According to the ranking-based mechanism for content identification described herein, if reference fingerprints for two nearly identical reference content items are stored in a fingerprint database, then both reference content items will be identified and returned as acceptable results after a trend detection mechanism is applied. The two nearly identical reference content items may have similar final scores, which may be based on the degree of trend fit for in-liers and/or all data points, on the average BER for in-liers and/or all data points, etc. For example, if two copies of a video clip (one with high quality and one with low quality) are represented in a fingerprint database, then a high quality query video will be more likely to match the high quality copy of the video clip and a low quality query video will be more likely to match the low quality copy of the video clip. In either case, however, the ranking-based mechanism described herein will be able to find and return the other copy after performing the trend detection (albeit with a different, probably lower, final score).

Figure 6B:
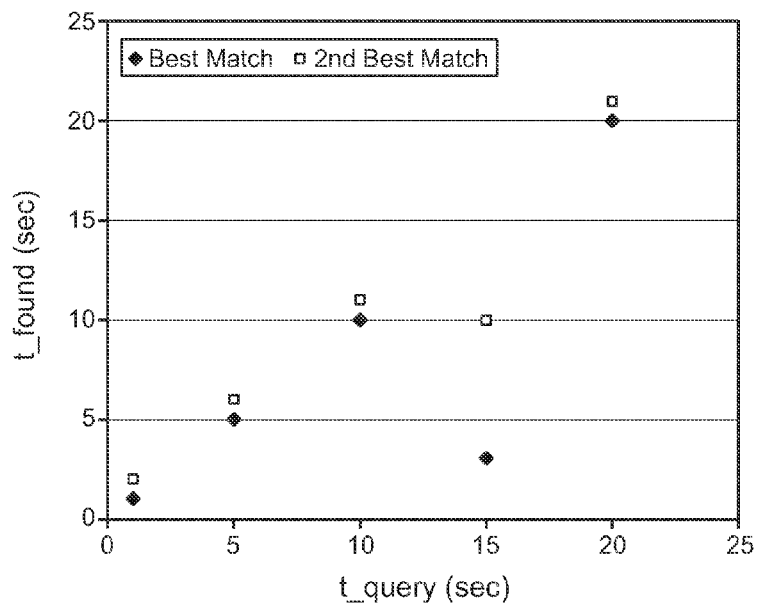
FIG. 6B illustrates a graph of matching results from an example application of a ranking-based mechanism according to one embodiment.

FIG. 6B illustrates the results of such operational scenario, in which a first best match and a second best match are plotted on a graph. In FIG. 6B, the diamond-shaped dots represent the first best match and the square-shaped dots represent the second best match. It is noted that due to some error the wrong match was found for the query fingerprint at query time 15 seconds, but for sake of simplicity it is assumed that the respective content identifier are still correct. It is also noted that, as illustrated in FIG. 6B, the second best match copy has a 1 second lag compared to the first best match copy.

When performing linear trend detection (e.g., by using a RANSAC-based mechanism), two data points with the same query time location should not be picked together for determining the slope of the initial line because such data points would indicate a vertical line or a slope of infinity, which in turn may result in a floating point error in some implementations of the ranking-based mechanism described herein.

It is noted that returning a "best" match, sorting by content identifiers, and performing trend detection may in and of itself may be sufficient to detect duplicate reference content items when the "best" match tends to oscillate between two nearly identical reference content items. However, depending on how the "best" match "oscillates", it may take more fingerprint searches and a longer duration of the query content item to reliably detect the duplicates when compared to returning top-K matches as utilized by the ranking-based mechanism described herein. If there is no "oscillation", then using the "best" match will not be able to detect duplicates in the fingerprint database at all. In comparison, the ranking-based mechanism described herein achieves faster and more reliable detection of duplicate reference content items. If the "best" match "oscillates" some but not a lot, the ranking-based mechanism described herein would require a shorter query duration—that is, less query fingerprints would be needed to obtain the same accuracy.

6.0 Implementation Mechanisms

Hardware Overview

According to one embodiment, the techniques for fingerprinting-based content identification described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
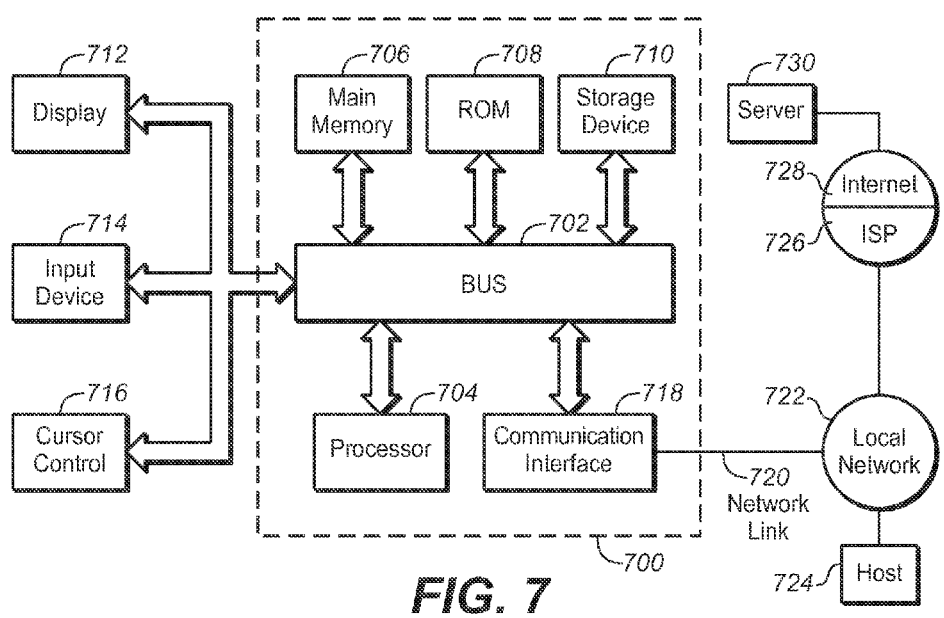
FIG. 7 is a block diagram that illustrates an example computer system on which embodiments may be implemented.

For example, FIG. 7 is a block diagram that illustrates a computer system 700 upon which a possible embodiment of the techniques described herein may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT) or a liquid crystal display (LCD), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein relates to any media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

7.0 Equivalents, Extensions, Miscellaneous and Alternatives

In the foregoing specification, embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

8.0 Example Embodiments

Thus, an embodiment of the invention may relate to one or more of the example embodiments, which are enumerated below.

Enumerated Example Embodiment 1. A method comprising one or more of the steps of:
- detecting linear trends based on bin-counting of data points that are generated from a set of query fingerprints, which are extracted from a query content item, and a set of correspondingly matching reference content items, which are extracted from a reference content item;
- detecting trends based on a RANSAC derived confidence scores that are computed for multiple candidate content items, wherein the trends detected for the candidate content items are compared against a threshold in order of decreasing confidence score until a trend that satisfies the threshold is found; or
- ranking fingerprint derived content identifications based on at least one of the bin-counting based detecting step or the RANSAC based detecting step, wherein duplicate or multiple reference content items are identified, which all match the same query content item; and
- computing an identity of the query content item based on one or more of the detected trends or the ranked identifications.

Enumerated Example Embodiment 2. The method as recited in Enumerated Example Embodiment 1, wherein detecting the linear trend based on bin-counting comprises:
(a) determining a first slope value as a current slope value;
(b) determining time offsets that respectively correspond to the data points, wherein each particular time offset corresponding to each particular data point is computed by subtracting, from the time location of the particular reference fingerprint corresponding to the particular data point, the multiplicative product of the current slope value and the time location of the particular query fingerprint corresponding to the particular data point;
(c) based on the time offsets, grouping the data points into a plurality of non-overlapping bins each having an equal bin size;
(d) counting the data points in each of the plurality of bins;
(e) determining a maximum bin, of the plurality of bins, that has a maximum count of data points;
(f) based at least on the maximum count of data points, determining one or more metrics for the maximum bin;
(g) comparing the one or more metrics to a current threshold;
(h) when the one or more metrics exceed the current threshold, determining that the data points exhibit a linear trend having the current slope value;
(i) when the one or more metrics do not exceed the current threshold, applying linear regression to a set of data points included in the maximum bin in order to determine a second slope value;
(j) setting the second slope value as the current slope value and the current threshold to a more restrictive threshold; and
(k) performing steps (b) through (h) for the data points based on the second slope value and the more restrictive threshold.

Enumerated Example Embodiment 3. The method as recited in Enumerated Example Embodiment 1, wherein detecting the trend based on the RANSAC derived confidence scores comprises:
- determining a time window for the query content item;
- accessing query results that are obtained in response to fingerprint queries that are performed against a fingerprint database, wherein the fingerprint queries specify query fingerprints that are extracted from the query content item within the time window;

grouping the query results into multiple groups that respectively indicate the multiple candidate content items, wherein each candidate content item is associated with a set of data points that are derived from those query results that are included in a group that corresponds to said each candidate content item;

applying a RANSAC algorithm for each candidate content item, of the multiple candidate content items, in order to determine a trend that fits the set of data points associated with said each candidate content item;

determining a confidence score for each candidate content item of the multiple candidate content items;

sorting the multiple candidate content items based on the confidence score determined for each candidate content item;

starting with the candidate content item having the highest confidence score, verifying against a threshold the trend determined for at least one candidate content item of the multiple candidate content items; and identifying as a matching content item that one candidate content item, of the multiple candidate content items, which has the trend that is verified first against the threshold.

Enumerated Example Embodiment 4. The method as recited in Enumerated Example Embodiment 1, wherein ranking the fingerprint derived content identifications comprises:

accessing query results that are obtained in response to fingerprint queries that are performed against a fingerprint database;

wherein a first number of multiple different query results are returned for at least a particular fingerprint query of the fingerprint queries;

grouping the query results, including the multiple different query results for the particular fingerprint query, into multiple groups that respectively indicate the multiple candidate content items, wherein each candidate content item is associated with a set of data points that are derived from those query results that are included in a distinct group, of the multiple groups, that corresponds to said each candidate content item;

applying a trend detection mechanism for each candidate content item, of the multiple candidate content items, in order to determine a trend that fits the set of data points associated with said each candidate content item;

based on trends determined for the multiple candidate content items, identifying as the matching duplicate or multiple reference content items a second number of candidate content items from the multiple candidate content items, wherein the second number is greater than or equal to the first number.

Enumerated Example Embodiment 5. A computer-implemented method for detecting linear trends in fingerprint-based content identification, comprising:

obtaining a plurality of data points from a plurality of query fingerprints and a plurality of reference fingerprints, wherein the plurality of query fingerprints respectively match the plurality of reference fingerprints;

wherein each particular data point is represented by a pair of time values, wherein a particular pair of time values includes a time location of a particular query fingerprint and a time location of a particular reference fingerprint, wherein the particular query fingerprint matches the particular reference fingerprint;

determining a first slope value as a current slope value; and detecting a linear trend among the plurality of data points, wherein the linear trend indicates a matching content item, and wherein detecting the linear trend comprises:

(a) determining a plurality of time offsets that respectively correspond to the plurality of data points, wherein each particular time offset corresponding to each particular data point is computed by subtracting, from the time location of the particular reference fingerprint corresponding to the particular data point, the multiplicative product of the current slope value and the time location of the particular query fingerprint corresponding to the particular data point;

(b) based on the plurality of time offsets, grouping the plurality of data points into a plurality of bins each having an equal bin size, wherein each particular bin represents a particular offset span that does not overlap with any other offset spans of any other bins of the plurality of bins;

(c) counting the data points in each particular bin of the plurality of bins;

(d) determining a maximum bin, of the plurality of bins, that has a maximum count of data points;

(e) based at least on the maximum count of data points, determining one or more metrics for the maximum bin;

(f) comparing the one or more metrics to a current threshold;

(g) when the one or more metrics exceed the current threshold, determining that the plurality of data points exhibit the linear trend having the current slope value;

(h) when the one or more metrics do not exceed the current threshold, applying linear regression to a set of data points included in the maximum bin in order to determine a second slope value;

(i) setting the second slope value as the current slope value and the current threshold to a more restrictive threshold; and (j) performing steps (a) through (g) for the plurality of data points based on the second slope value and the more restrictive threshold.

Enumerated Example Embodiment 6. The method as recited in Enumerated Example Embodiment 5, wherein detecting the linear trend further comprises:

based on the more restrictive threshold, determining that the plurality of data points do not exhibit a valid linear trend having the second slope value; and performing steps (a) through (j) for the plurality of data points based on the second slope value.

Enumerated Example Embodiment 7. The method as recited in Enumerated Example Embodiment 5, wherein applying the linear regression to the set of data points further comprises:

removing from the set of data points any data points that are indicated as out-liers by the linear regression; and re-applying the linear regression to the remaining data points, in the set of data points, in order to determine the second slope value.

Enumerated Example Embodiment 8. The method as recited in Enumerated Example Embodiment 5, wherein detecting the linear trend further comprises determining the current threshold by multiplying a constant value to one of:

an average count of data points in the plurality of bins;

a total number of data points in the plurality of bins; or an average count of data points in those bins, of the plurality of bins, that include at least one data point.

Enumerated Example Embodiment 9. The method as recited in Enumerated Example Embodiment 5, wherein determining the first slope value comprises setting the current slope value to be substantially equal to a whole number.

Enumerated Example Embodiment 10. The method as recited in Enumerated Example Embodiment 5, wherein determining the first slope value comprises applying a RANSAC algorithm to the plurality of data points to determine the first slope value.

Enumerated Example Embodiment 11. The method as recited in Enumerated Example Embodiment 5, further comprising:
based on the current slope value, determining a set of in-lier data points that are positioned within the linear trend;
determining a set of reference fingerprints, of the plurality of fingerprints, that are associated with the set of in-lier data points; and
determining the matching content item based on the set of reference fingerprints.

Enumerated Example Embodiment 12. The method as recited in Enumerated Example Embodiment 5, wherein each data point, of the plurality of data points, includes a time location of a reference fingerprint that is associated with the same content identifier indicating the same reference content item.

Enumerated Example Embodiment 13. The method as recited in Enumerated Example Embodiment 5, wherein counting the data points in each particular bin of the plurality of bins comprises determining how many data points, of the plurality of data points, have corresponding time offsets that fall within the particular offset span represented by said each particular bin.

Enumerated Example Embodiment 14. The method as recited in Enumerated Example Embodiment 5, wherein:
the current threshold includes an absolute threshold value and a relative threshold value;
the one or more metrics include a first metric and a second metric, wherein:
the first metric is the maximum count of data points;
the second metric is a ratio between the maximum count of data points and a total number of data points in the plurality of bins; and
comparing the one or more metrics to the current threshold comprises comparing the first metric to the absolute threshold value and comparing the second metric to the relative threshold value.

Enumerated Example Embodiment 15. The method as recited in Enumerated Example Embodiment 5, wherein detecting the linear trend further comprises determining the bin size based on a time interval between the minimum time offset and the maximum time offset computed for all query fingerprints in the plurality of query fingerprints.

Enumerated Example Embodiment 16. The method as recited in Enumerated Example Embodiment 5, further comprising:
extracting the plurality of query fingerprints from at least one query content item;
performing one or more queries against a fingerprint database, wherein the one or more queries specify the plurality of query fingerprints; and
receiving the plurality of reference fingerprints from the fingerprint database in response to the one or more queries.

Enumerated Example Embodiment 17. The method as recited in Enumerated Example Embodiment 5, further comprising extracting the plurality of query fingerprints from at least one query content item that includes one or more of audio content and video content.

Enumerated Example Embodiment 18. A computer-implemented method for fingerprint-based content identification, comprising:
determining a time window for a query content item;
accessing a plurality of query results that are obtained in response to a plurality of fingerprint queries that are performed against a fingerprint database, wherein the plurality of fingerprint queries specify query fingerprints that are extracted from the query content item within the time window;
grouping the plurality of query results into multiple groups that respectively indicate multiple candidate content items, wherein each candidate content item is associated with a set of data points that are derived from query results included in a group that corresponds to said each candidate content item;
applying a RANSAC algorithm for each candidate content item, of the multiple candidate content items, in order to determine a trend that fits the set of data points associated with said each candidate content item;
determining a confidence score for each candidate content item of the multiple candidate content items, wherein the confidence score is based on one or more coefficient values and the number of in-lier data points of the trend determined for said each candidate content item;
sorting the multiple candidate content items based on the confidence score determined for each candidate content item;
starting with the candidate content item having the highest confidence score, verifying against a threshold the trend determined for at least one candidate content item of the multiple candidate content items; and
identifying as a matching content item that one candidate content item, of the multiple candidate content items, which has the trend that is verified first against the threshold.

Enumerated Example Embodiment 19. The method as recited in Enumerated Example Embodiment 18, wherein the method is performed offline and wherein the time window is the entire time length of the query content item.

Enumerated Example Embodiment 20. The method as recited in Enumerated Example Embodiment 18, wherein the method is performed online as the query content item is being processed as a stream, and wherein the method further comprises:
incrementally updating the time window and searching for the matching content item until the matching content item is found or until processing of the stream is completed.

Enumerated Example Embodiment 21. The method as recited in Enumerated Example Embodiment 18, wherein applying the RANSAC algorithm for each candidate content item of the multiple candidate content items further comprises:
foregoing processing for any trends that have one or more coefficient values that are outside one or more corresponding ranges.

Enumerated Example Embodiment 22. The method as recited in Enumerated Example Embodiment 21, wherein the one or more corresponding ranges are ranges of real numbers.

Enumerated Example Embodiment 23. The method as recited in Enumerated Example Embodiment 18, wherein the method is performed online as the query content item is being processed as a stream, and wherein the method further comprises:
updating the time window by using variable-length increments based on the likelihood of detecting trends within one or more previous time windows, and searching for the matching content item until the matching content item is found or until processing of the stream is completed.

Enumerated Example Embodiment 24. The method as recited in Enumerated Example Embodiment 23, wherein the likelihood is based on an inliers-per-second metric that represents the number of normalized in-lier data points per second.

Enumerated Example Embodiment 25. The method as recited in Enumerated Example Embodiment 18, wherein applying the RANSAC algorithm for each candidate content item of the multiple candidate content items further comprises:
applying the RANSAC algorithm by using an in-lier tolerance substantially equal to a certain fraction of a second.

Enumerated Example Embodiment 26. The method as recited in Enumerated Example Embodiment 18, wherein the trend for said each candidate content item is a linear trend and the one or more coefficient values include a slope value of the linear trend, and wherein the confidence score for each candidate content item of the multiple candidate content items is computed based on the multiplicative function $$S=N_{inlier}*\max(e^{-10*|k-1|},e^{-10*0.15})$$

wherein "S" is the confidence score for said each candidate content item,
wherein "$N_{inlier}$" is the number of in-lier data points of the linear trend determined for said each candidate content item, and
wherein "k" is the slope value of the linear trend determined for said each candidate content item.

Enumerated Example Embodiment 27. The method as recited in Enumerated Example Embodiment 18, wherein grouping the plurality of query results into multiple groups that respectively indicate multiple candidate content items comprises:
excluding from the multiple candidate content items any candidate content items that correspond to groups having a frequency of query results that is less than a certain frequency.

Enumerated Example Embodiment 28. The method as recited in Enumerated Example Embodiment 18, wherein the threshold comprises an in-lier threshold value and a density threshold value, and wherein verifying against the threshold the trend determined for said at least one candidate content item comprises:
splitting the time window into segments of constant duration;
determining a segment count that represents the number of segments that include at least one in-lier data point, wherein each of the segments represents a normalized in-lier data point;
determining a density metric that represents the number of normalized in-lier data points per second;
comparing the segment count to the in-lier threshold value and the density metric to the density threshold value; and
verifying the trend for said at least one candidate content item when the segment count exceeds the in-lier threshold value and the density metric exceeds the density threshold value.

Enumerated Example Embodiment 29. The method as recited in Enumerated Example Embodiment 28, wherein the constant duration of the segments is a certain fraction of a second.

Enumerated Example Embodiment 30. The method as recited in Enumerated Example Embodiment 28, wherein the in-lier threshold value and the density threshold value are determined based on one of:
the constant duration of the segments; or
the time length of the query content item.

Enumerated Example Embodiment 31. The method as recited in Enumerated Example Embodiment 18, wherein the query content item includes one or more of audio content and video content.

Enumerated Example Embodiment 32. A computer-implemented method for fingerprint-based content identification, comprising:
accessing a plurality of query results that are obtained in response to a plurality of fingerprint queries that are performed against a fingerprint database, wherein the plurality of fingerprint queries specify query fingerprints that are extracted from a query content item;
grouping the plurality of query results into multiple groups that respectively indicate multiple candidate content items, wherein each candidate content item is associated with a set of data points that are derived from query results included in a group that corresponds to said each candidate content item;
applying a RANSAC algorithm for each candidate content item, of the multiple candidate content items, in order to determine a trend that fits the set of data points associated with said each candidate content item;
verifying against a threshold the trend determined for at least one candidate content item of the multiple candidate content items; and
identifying as a matching content item that one candidate content item, of the multiple candidate content items, which has the trend that is verified first against the threshold.

Enumerated Example Embodiment 33. The method as recited in Enumerated Example Embodiment 32, wherein the trend for said each candidate content item is a linear trend, and wherein the method further comprises:
determining a confidence score for each candidate content item of the multiple candidate content items, wherein the confidence score is based on the slope value and the number of in-lier data points of the linear trend determined for said each candidate content item;
wherein the confidence score for said each candidate content item of the multiple candidate content items is computed based on the multiplicative function $$S=N_{inlier}*\max(e^{-10*|k-1|},e^{-10*0.15})$$

wherein "S" is the confidence score for said each candidate content item,
wherein "$N_{inlier}$" is the number of in-lier data points of the linear trend determined for said each candidate content item, and
wherein "k" is the slope value of the linear trend determined for said each candidate content item; and
prior to the step of verifying, sorting the multiple candidate content items based on the confidence score determined for said each candidate content item.

Enumerated Example Embodiment 34. The method as recited in Enumerated Example Embodiment 32, wherein the threshold comprises an in-lier threshold value and a density threshold value, and wherein verifying against the threshold the trend determined for said at least one candidate content item comprises:
splitting a time window of the query content item into segments of constant duration;

determining a segment count that represents the number of segments that include at least one in-lier data point, wherein each of the segments represents a normalized in-lier data point;

determining a density metric that represents the number of normalized in-lier data points per second;

comparing the segment count to the in-lier threshold value and the density metric to the density threshold value; and verifying the trend for said at least one candidate content item when the segment count exceeds the in-lier threshold value and the density metric exceeds the density threshold value.

Enumerated Example Embodiment 35. The method as recited in Enumerated Example Embodiment 34, wherein the constant duration of the segments comprises a certain fraction of a second.

Enumerated Example Embodiment 36. The method as recited in Enumerated Example Embodiment 34, wherein the in-lier threshold value and the density threshold value are determined based on at least one of:
the constant duration of the segments; or
the time length of the query content item.

Enumerated Example Embodiment 37. A computer-implemented method for fingerprint-based content identification, comprising:

accessing a plurality of query results that are obtained in response to a plurality of fingerprint queries that are performed against a fingerprint database, wherein the plurality of fingerprint queries specify query fingerprints that are extracted from a query content item within the time window;

grouping the plurality of query results into multiple groups that respectively indicate multiple candidate content items, wherein each candidate content item is associated with a set of data points that are derived from query results included in a group that corresponds to said each candidate content item;

applying a RANSAC algorithm for each candidate content item, of the multiple candidate content items, in order to determine a trend that fits the set of data points associated with said each candidate content item, wherein applying the RANSAC algorithm for said each candidate content item comprises:
foregoing processing for any trends that have one or more coefficient values that are outside one or more corresponding ranges; and
based on the trends determined for the multiple candidate content items, identifying, from the multiple candidate content items, a matching content item for the query content item.

Enumerated Example Embodiment 38. The method as recited in Enumerated Example Embodiment 37, wherein the one or more corresponding ranges are ranges of real numbers.

Enumerated Example Embodiment 39. The method as recited in Enumerated Example Embodiment 37, wherein grouping the plurality of query results into multiple groups that respectively indicate multiple candidate content items comprises:
excluding from the multiple candidate content items any candidate content items that correspond to groups having a frequency of query results that is less than a certain frequency.

Enumerated Example Embodiment 40. The method as recited in Enumerated Example Embodiment 37, wherein identifying the matching content item comprises:
identifying as the matching content item that one candidate content item, of the multiple candidate content items, which has the trend that is verified first against a threshold.

Enumerated Example Embodiment 41. A computer-implemented method for trend detection based on a RANSAC algorithm, comprising one or more steps from the steps of:

applying the RANSAC algorithm and determining a confidence score for each candidate content item of multiple candidate content items that represent multiple groups which include query results obtained in response to a plurality of fingerprint queries;

applying the RANSAC algorithm for each candidate content item of the multiple candidate content items, wherein at each iteration loop of the RANSAC algorithm processing is not performed for any coefficient values that are outside particular corresponding ranges; and applying the RANSAC algorithm and verifying against a threshold the trend determined for at least one candidate content item of the multiple candidate content items, wherein verifying against the threshold comprises one or more of:
comparing an in-lier threshold value to a segment count of segments from a query content item, wherein each segment represents a normalized in-lier data point; and
comparing a density threshold value to a density metric that represents the number of normalized in-lier data points per second within the query content item.

Enumerated Example Embodiment 42. The method as recited in Enumerated Example Embodiment 41, wherein:
the trend for said at least one candidate content item is a linear trend and the coefficient values include a slope value of the linear trend;
the confidence score for each candidate content item of the multiple candidate content items is computed based on the multiplicative function $$S = N_{inlier} * \max(e^{-10*|k-1|}, e^{-10*0.15})$$

wherein "S" is the confidence score for said each candidate content item,
wherein "$N_{inlier}$" is the number of in-lier data points of a linear trend determined for said each candidate content item, and
wherein "k" is the slope value of the linear trend determined for said each candidate content item;
the method further comprises the step of identifying a matching content item from the multiple candidate content items based at least on the confidence scores determined for one or more of the multiple candidate content items.

Enumerated Example Embodiment 43. The method as recited in Enumerated Example Embodiment 41, wherein:
the particular corresponding ranges are ranges of real numbers; and
the method further comprises the step of identifying a matching content item from the multiple candidate content items.

Enumerated Example Embodiment 44. The method as recited in Enumerated Example Embodiment 41, further comprising the step of:
identifying a candidate content item of the multiple candidate content items as a matching content item, wherein the identified candidate content item has a trend that is verified first against the threshold.

Enumerated Example Embodiment 45. The method as recited in any one of Enumerated Example Embodiments 18, 32, 37, and 41, further comprising:
  determining a model against which to match the query results;
  wherein applying the RANSAC algorithm further comprises applying the RANSAC algorithm based on the determined model.

Enumerated Example Embodiment 46. The method as recited in any one of Enumerated Example Embodiments 18, 32, 37, and 41, wherein the trend is one of a linear trend and a non-linear trend.

Enumerated Example Embodiment 47. A computer-implemented method for fingerprint-based content identification, comprising:
  accessing a plurality of query results that are obtained in response to a plurality of fingerprint queries that are performed against a fingerprint database;
  wherein up to a first number of multiple different query results, of the plurality of query results, are returned for at least a particular fingerprint query of the plurality of fingerprint queries;
  grouping the plurality of query results, including the multiple different query results, into multiple groups that respectively indicate multiple candidate content items, wherein each candidate content item is associated with a set of data points that are derived from query results included in a distinct group, of the multiple groups, that corresponds to said each candidate content item;
  applying a trend detection mechanism for each candidate content item, of the multiple candidate content items, in order to determine a trend that fits the set of data points associated with said each candidate content item;
  based on trends determined for the multiple candidate content items, identifying matching content items from up to a second number of candidate content items from the multiple candidate content items, wherein the second number is greater than or equal to the first number.

Enumerated Example Embodiment 48. The method as recited in Enumerated Example Embodiment 47, wherein the trend detection mechanism comprises a bin-counting linear trend detection mechanism.

Enumerated Example Embodiment 49. The method as recited in Enumerated Example Embodiment 47, wherein the trend detection mechanism comprises a RANSAC-based trend detection mechanism.

Enumerated Example Embodiment 50. The method as recited in Enumerated Example Embodiment 47, further comprising receiving user input that specifies the first number and the second number.

Enumerated Example Embodiment 51. The method as recited in Enumerated Example Embodiment 47, wherein the first number is equal to the second number.

Enumerated Example Embodiment 52. One or more storage media storing one or more sequences of instructions which, when executed by one or more computing devices, cause performance of one or more of the steps of:
  detecting linear trends based on bin-counting of data points that are generated from a set of query fingerprints, which are extracted from a query content item, and a set of correspondingly matching reference content items, which are extracted from a reference content item;
  detecting trends based on a RANSAC derived confidence scores that are computed for multiple candidate content items, wherein the trends detected for the candidate content items are compared against a threshold in order of decreasing confidence score until a trend that satisfies the threshold is found; or
  ranking fingerprint derived content identifications based on at least one of the bin-counting based detecting step or the RANSAC based detecting step, wherein duplicate or multiple reference content items are identified, which all match the same query content item; and
  computing an identity of the query content item based on one or more of the detected trends or the ranked identifications.

Enumerated Example Embodiment 53. The one or more storage media as recited in Enumerated Example Embodiment 52, wherein the instructions that cause detecting the linear trend based on bin-counting comprise instructions which, when executed by the one or more computing devices, cause performance of the steps of:
  (a) determining a first slope value as a current slope value;
  (b) determining time offsets that respectively correspond to the data points, wherein each particular time offset corresponding to each particular data point is computed by subtracting, from the time location of the particular reference fingerprint corresponding to the particular data point, the multiplicative product of the current slope value and the time location of the particular query fingerprint corresponding to the particular data point;
  (c) based on the time offsets, grouping the data points into a plurality of non-overlapping bins each having an equal bin size;
  (d) counting the data points in each of the plurality of bins;
  (e) determining a maximum bin, of the plurality of bins, that has a maximum count of data points;
  (f) based at least on the maximum count of data points, determining one or more metrics for the maximum bin;
  (g) comparing the one or more metrics to a current threshold;
  (h) when the one or more metrics exceed the current threshold, determining that the data points exhibit a linear trend having the current slope value;
  (i) when the one or more metrics do not exceed the current threshold, applying linear regression to a set of data points included in the maximum bin in order to determine a second slope value;
  (j) setting the second slope value as the current slope value and the current threshold to a more restrictive threshold; and
  (k) performing steps (b) through (h) for the data points based on the second slope value and the more restrictive threshold.

Enumerated Example Embodiment 54. The one or more storage media as recited in Enumerated Example Embodiment 52, wherein the instructions that cause detecting the trend based on the RANSAC derived confidence scores comprise instructions which, when executed by the one or more computing devices, cause performance of the steps of:
  determining a time window for the query content item;
  accessing query results that are obtained in response to fingerprint queries that are performed against a fingerprint database, wherein the fingerprint queries specify query fingerprints that are extracted from the query content item within the time window;
  grouping the query results into multiple groups that respectively indicate the multiple candidate content items, wherein each candidate content item is associated with a set of data points that are derived from those query results that are included in a group that corresponds to said each candidate content item;

applying a RANSAC algorithm for each candidate content item, of the multiple candidate content items, in order to determine a trend that fits the set of data points associated with said each candidate content item;

determining a confidence score for each candidate content item of the multiple candidate content items;

sorting the multiple candidate content items based on the confidence score determined for each candidate content item;

starting with the candidate content item having the highest confidence score, verifying against a threshold the trend determined for at least one candidate content item of the multiple candidate content items; and identifying as a matching content item that one candidate content item, of the multiple candidate content items, which has the trend that is verified first against the threshold.

Enumerated Example Embodiment 55. The one or more storage media as recited in Enumerated Example Embodiment 52, wherein the instructions that cause ranking the fingerprint derived content identifications comprise instructions which, when executed by the one or more computing devices, cause performance of the steps of:

accessing query results that are obtained in response to fingerprint queries that are performed against a fingerprint database;

wherein a first number of multiple different query results are returned for at least a particular fingerprint query of the fingerprint queries;

grouping the query results, including the multiple different query results for the particular fingerprint query, into multiple groups that respectively indicate the multiple candidate content items, wherein each candidate content item is associated with a set of data points that are derived from those query results that are included in a distinct group, of the multiple groups, that corresponds to said each candidate content item;

applying a trend detection mechanism for each candidate content item, of the multiple candidate content items, in order to determine a trend that fits the set of data points associated with said each candidate content item;

based on trends determined for the multiple candidate content items, identifying as the matching duplicate or multiple reference content items a second number of candidate content items from the multiple candidate content items, wherein the second number is greater than or equal to the first number.

Enumerated Example Embodiment 56. One or more storage media storing one or more sequences of instructions which, when executed by one or more computing devices, cause performance of steps comprising:

obtaining a plurality of data points from a plurality of query fingerprints and a plurality of reference fingerprints, wherein the plurality of query fingerprints respectively match the plurality of reference fingerprints;

wherein each particular data point is represented by a pair of time values, wherein a particular pair of time values includes a time location of a particular query fingerprint and a time location of a particular reference fingerprint, wherein the particular query fingerprint matches the particular reference fingerprint;

determining a first slope value as a current slope value; and detecting a linear trend among the plurality of data points, wherein the linear trend indicates a matching content item, and wherein detecting the linear trend comprises:

(a) determining a plurality of time offsets that respectively correspond to the plurality of data points, wherein each particular time offset corresponding to each particular data point is computed by subtracting, from the time location of the particular reference fingerprint corresponding to the particular data point, the multiplicative product of the current slope value and the time location of the particular query fingerprint corresponding to the particular data point;

(b) based on the plurality of time offsets, grouping the plurality of data points into a plurality of bins each having an equal bin size, wherein each particular bin represents a particular offset span that does not overlap with any other offset spans of any other bins of the plurality of bins;

(c) counting the data points in each particular bin of the plurality of bins;

(d) determining a maximum bin, of the plurality of bins, that has a maximum count of data points;

(e) based at least on the maximum count of data points, determining one or more metrics for the maximum bin;

(f) comparing the one or more metrics to a current threshold;

(g) when the one or more metrics exceed the current threshold, determining that the plurality of data points exhibit the linear trend having the current slope value;

(h) when the one or more metrics do not exceed the current threshold, applying linear regression to a set of data points included in the maximum bin in order to determine a second slope value;

(i) setting the second slope value as the current slope value and the current threshold to a more restrictive threshold; and (j) performing steps (a) through (g) for the plurality of data points based on the second slope value and the more restrictive threshold.

Enumerated Example Embodiment 57. The one or more storage media as recited in Enumerated Example Embodiment 56, wherein the instructions that cause detecting the linear trend further comprise instructions which, when executed by the one or more computing devices, cause performance of:

based on the more restrictive threshold, determining that the plurality of data points do not exhibit a valid linear trend having the second slope value; and performing steps (a) through (j) for the plurality of data points based on the second slope value.

Enumerated Example Embodiment 58. The one or more storage media as recited in Enumerated Example Embodiment 57, wherein the instructions that cause applying the linear regression to the set of data points further comprise instructions which, when executed by the one or more computing devices, cause performance of:

removing from the set of data points any data points that are indicated as out-liers by the linear regression; and re-applying the linear regression to the remaining data points, in the set of data points, in order to determine the second slope value.

Enumerated Example Embodiment 59. The one or more storage media as recited in Enumerated Example Embodiment 56, wherein the instructions that cause detecting the linear trend further comprise instructions which, when executed by the one or more computing devices, cause performance of determining the current threshold by multiplying a constant value to one of:

an average count of data points in the plurality of bins;
a total number of data points in the plurality of bins; or
an average count of data points in those bins, of the plurality of bins, that include at least one data point.

Enumerated Example Embodiment 60. The one or more storage media as recited in Enumerated Example Embodiment 56, wherein the instructions that cause determining the first slope value comprise instructions which, when executed by the one or more computing devices, cause performance of setting the current slope value to be substantially equal to a whole number.

Enumerated Example Embodiment 61. The one or more storage media as recited in Enumerated Example Embodiment 56, wherein the instructions that cause determining the first slope value comprise instructions which, when executed by the one or more computing devices, cause performance of applying a RANSAC algorithm to the plurality of data points to determine the first slope value.

Enumerated Example Embodiment 62. The one or more storage media as recited in Enumerated Example Embodiment 56, wherein the one or more sequences of instructions further comprise instructions which, when executed by the one or more computing devices, cause performance of:
based on the current slope value, determining a set of in-lier data points that are positioned within the linear trend;
determining a set of reference fingerprints, of the plurality of fingerprints, that are associated with the set of in-lier data points; and
determining the matching content item based on the set of reference fingerprints.

Enumerated Example Embodiment 63. The one or more storage media as recited in Enumerated Example Embodiment 56, wherein each data point, of the plurality of data points, includes a time location of a reference fingerprint that is associated with the same content identifier indicating the same reference content item.

Enumerated Example Embodiment 64. The one or more storage media as recited in Enumerated Example Embodiment 56, wherein the instructions that cause counting the data points in each particular bin of the plurality of bins comprise instructions which, when executed by the one or more computing devices, cause performance of determining how many data points, of the plurality of data points, have corresponding time offsets that fall within the particular offset span represented by said each particular bin.

Enumerated Example Embodiment 65. The one or more storage media as recited in Enumerated Example Embodiment 56, wherein:
the current threshold includes an absolute threshold value and a relative threshold value;
the one or more metrics include a first metric and a second metric, wherein:
the first metric is the maximum count of data points;
the second metric is a ratio between the maximum count of data points and a total number of data points in the plurality of bins; and
the instructions that cause comparing the one or more metrics to the current threshold comprise instructions which, when executed by the one or more computing devices, cause performance of comparing the first metric to the absolute threshold value and comparing the second metric to the relative threshold value.

Enumerated Example Embodiment 66. The one or more storage media as recited in Enumerated Example Embodiment 56, wherein the instructions that cause detecting the linear trend further comprise instructions which, when executed by the one or more computing devices, cause performance of determining the bin size based on a time interval between the minimum time offset and the maximum time offset computed for all query fingerprints in the plurality of query fingerprints.

Enumerated Example Embodiment 67. The one or more storage media as recited in Enumerated Example Embodiment 56, wherein the one or more sequences of instructions further comprise instructions which, when executed by the one or more computing devices, cause performance of:
extracting the plurality of query fingerprints from at least one query content item;
performing one or more queries against a fingerprint database, wherein the one or more queries specify the plurality of query fingerprints; and
receiving the plurality of reference fingerprints from the fingerprint database in response to the one or more queries.

Enumerated Example Embodiment 68. The one or more storage media as recited in Enumerated Example Embodiment 56, wherein the one or more sequences of instructions further comprise instructions which, when executed by the one or more computing devices, cause performance of extracting the plurality of query fingerprints from at least one query content item that includes one or more of audio content and video content.

Enumerated Example Embodiment 69. One or more storage media storing one or more sequences of instructions which, when executed by one or more computing devices, cause performance of steps comprising:
determining a time window for a query content item;
accessing a plurality of query results that are obtained in response to a plurality of fingerprint queries that are performed against a fingerprint database, wherein the plurality of fingerprint queries specify query fingerprints that are extracted from the query content item within the time window;
grouping the plurality of query results into multiple groups that respectively indicate multiple candidate content items, wherein each candidate content item is associated with a set of data points that are derived from query results included in a group that corresponds to said each candidate content item;
applying a RANSAC algorithm for each candidate content item, of the multiple candidate content items, in order to determine a trend that fits the set of data points associated with said each candidate content item;
determining a confidence score for each candidate content item of the multiple candidate content items, wherein the confidence score is based on one or more coefficient values and the number of in-lier data points of the trend determined for said each candidate content item;
sorting the multiple candidate content items based on the confidence score determined for each candidate content item;
starting with the candidate content item having the highest confidence score, verifying against a threshold the trend determined for at least one candidate content item of the multiple candidate content items; and
identifying as a matching content item that one candidate content item, of the multiple candidate content items, which has the trend that is verified first against the threshold.

Enumerated Example Embodiment 70. The one or more storage media as recited in Enumerated Example Embodiment 69, wherein the one or more sequences of instructions are performed offline and wherein the time window is the entire time length of the query content item.

Enumerated Example Embodiment 71. The one or more storage media as recited in Enumerated Example Embodiment 69, wherein the one or more sequences of instructions are performed online as the query content item is being processed as a stream, and wherein the one or more sequences of instructions further comprise instructions which, when executed by the one or more computing devices, cause performance of:
incrementally updating the time window and searching for the matching content item until the matching content item is found or until processing of the stream is completed.

Enumerated Example Embodiment 72. The one or more storage media as recited in Enumerated Example Embodiment 69, wherein the instructions that cause applying the RANSAC algorithm for each candidate content item of the multiple candidate content items further comprise instructions which, when executed by the one or more computing devices, cause performance of:
foregoing processing for any trends that have one or more coefficient values that are outside one or more corresponding ranges.

Enumerated Example Embodiment 73. The one or more storage media as recited in Enumerated Example Embodiment 72, wherein the one or more corresponding ranges are ranges of real numbers.

Enumerated Example Embodiment 74. The one or more storage media as recited in Enumerated Example Embodiment 69, wherein the one or more sequences of instructions are performed online as the query content item is being processed as a stream, and wherein the one or more sequences of instructions further comprise instructions which, when executed by the one or more computing devices, cause performance of:
updating the time window by using variable-length increments based on the likelihood of detecting trends within one or more previous time windows, and searching for the matching content item until the matching content item is found or until processing of the stream is completed.

Enumerated Example Embodiment 75. The one or more storage media as recited in Enumerated Example Embodiment 74, wherein the likelihood is based on an inliers-per-second metric that represents the number of normalized in-lier data points per second.

Enumerated Example Embodiment 76. The one or more storage media as recited in Enumerated Example Embodiment 69, wherein the instructions that cause applying the RANSAC algorithm for each candidate content item of the multiple candidate content items further comprise instructions which, when executed by the one or more computing devices, cause performance of:
applying the RANSAC algorithm by using an in-lier tolerance substantially equal to a certain fraction of a second.

Enumerated Example Embodiment 77. The one or more storage media as recited in Enumerated Example Embodiment 69, wherein the trend for said each candidate content item is a linear trend and the one or more coefficient values include a slope value of the linear trend, and wherein the confidence score for each candidate content item of the multiple candidate content items is computed based on the multiplicative function $$S = N_{inlier} * \max(e^{-10*|k-1|}, e^{-10*0.15})$$

wherein "S" is the confidence score for said each candidate content item,
wherein "$N_{inlier}$" is the number of in-lier data points of the linear trend determined for said each candidate content item, and
wherein "k" is the slope value of the linear trend determined for said each candidate content item.

Enumerated Example Embodiment 78. The one or more storage media as recited in Enumerated Example Embodiment 69, wherein the instructions that cause grouping the plurality of query results into multiple groups that respectively indicate multiple candidate content items comprise instructions which, when executed by the one or more computing devices, cause performance of:
excluding from the multiple candidate content items any candidate content items that correspond to groups having a frequency of query results that is less than a certain frequency.

Enumerated Example Embodiment 79. The one or more storage media as recited in Enumerated Example Embodiment 69, wherein the threshold comprises an in-lier threshold value and a density threshold value, and wherein the instructions that cause verifying against the threshold the trend determined for said at least one candidate content item comprise instructions which, when executed by the one or more computing devices, cause performance of:
splitting the time window into segments of constant duration;
determining a segment count that represents the number of segments that include at least one in-lier data point, wherein each of the segments represents a normalized in-lier data point;
determining a density metric that represents the number of normalized in-lier data points per second;
comparing the segment count to the in-lier threshold value and the density metric to the density threshold value; and
verifying the trend for said at least one candidate content item when the segment count exceeds the in-lier threshold value and the density metric exceeds the density threshold value.

Enumerated Example Embodiment 80. The one or more storage media as recited in Enumerated Example Embodiment 79, wherein the constant duration of the segments is a certain fraction of a second.

Enumerated Example Embodiment 81. The one or more storage media as recited in Enumerated Example Embodiment 79, wherein the in-lier threshold value and the density threshold value are determined based on one of:
the constant duration of the segments; or
the time length of the query content item.

Enumerated Example Embodiment 82. The one or more storage media as recited in Enumerated Example Embodiment 69, wherein the query content item includes one or more of audio content and video content.

Enumerated Example Embodiment 83. One or more storage media storing one or more sequences of instructions which, when executed by one or more computing devices, cause performance of steps comprising:
accessing a plurality of query results that are obtained in response to a plurality of fingerprint queries that are performed against a fingerprint database, wherein the plurality of fingerprint queries specify query fingerprints that are extracted from a query content item;
grouping the plurality of query results into multiple groups that respectively indicate multiple candidate content items, wherein each candidate content item is associated with a set of data points that are derived from query results included in a group that corresponds to said each candidate content item;

applying a RANSAC algorithm for each candidate content item, of the multiple candidate content items, in order to determine a trend that fits the set of data points associated with said each candidate content item;

verifying against a threshold the trend determined for at least one candidate content item of the multiple candidate content items; and identifying as a matching content item that one candidate content item, of the multiple candidate content items, which has the trend that is verified first against the threshold.

Enumerated Example Embodiment 84. The one or more storage media as recited in Enumerated Example Embodiment 83, wherein the trend for said each candidate content item is a linear trend, and wherein the one or more sequences of instructions further comprise instructions which, when executed by the one or more computing devices, cause performance of steps comprising:

determining a confidence score for each candidate content item of the multiple candidate content items, wherein the confidence score is based on the slope value and the number of in-lier data points of the linear trend determined for said each candidate content item;

wherein the confidence score for said each candidate content item of the multiple candidate content items is computed based on the multiplicative function $$S = N_{inlier} * \max(e^{-10*|k-1|}, e^{-10*0.15})$$

wherein "S" is the confidence score for said each candidate content item, wherein "$N_{inlier}$" is the number of in-lier data points of the linear trend determined for said each candidate content item, and wherein "k" is the slope value of the linear trend determined for said each candidate content item; and prior to the step of verifying, sorting the multiple candidate content items based on the confidence score determined for said each candidate content item.

Enumerated Example Embodiment 85. The one or more storage media as recited in Enumerated Example Embodiment 83, wherein the threshold comprises an in-lier threshold value and a density threshold value, and wherein the instructions that cause verifying against the threshold the trend determined for said at least one candidate content item comprise instructions which, when executed by the one or more computing devices, cause performance of:

splitting a time window of the query content item into segments of constant duration;

determining a segment count that represents the number of segments that include at least one in-lier data point, wherein each of the segments represents a normalized in-lier data point;

determining a density metric that represents the number of normalized in-lier data points per second;

comparing the segment count to the in-lier threshold value and the density metric to the density threshold value; and verifying the trend for said at least one candidate content item when the segment count exceeds the in-lier threshold value and the density metric exceeds the density threshold value.

Enumerated Example Embodiment 86. The one or more storage media as recited in Enumerated Example Embodiment 85, wherein the constant duration of the segments is a certain fraction of a second.

Enumerated Example Embodiment 87. The one or more storage media as recited in Enumerated Example Embodiment 85, wherein the in-lier threshold value and the density threshold value are determined based on one of:

the constant duration of the segments; or the time length of the query content item.

Enumerated Example Embodiment 88. One or more storage media storing one or more sequences of instructions which, when executed by one or more computing devices, cause performance of steps comprising:

accessing a plurality of query results that are obtained in response to a plurality of fingerprint queries that are performed against a fingerprint database, wherein the plurality of fingerprint queries specify query fingerprints that are extracted from a query content item within the time window;

grouping the plurality of query results into multiple groups that respectively indicate multiple candidate content items, wherein each candidate content item is associated with a set of data points that are derived from query results included in a group that corresponds to said each candidate content item;

applying a RANSAC algorithm for each candidate content item, of the multiple candidate content items, in order to determine a trend that fits the set of data points associated with said each candidate content item, wherein applying the RANSAC algorithm for said each candidate content item comprises:

foregoing processing for any trends that have one or more coefficient values that are outside one or more corresponding ranges; and based on the trends determined for the multiple candidate content items, identifying, from the multiple candidate content items, a matching content item for the query content item.

Enumerated Example Embodiment 89. The one or more storage media as recited in Enumerated Example Embodiment 88, wherein the one or more corresponding ranges are ranges of real numbers.

Enumerated Example Embodiment 90. The one or more storage media as recited in Enumerated Example Embodiment 88, wherein the instructions that cause grouping the plurality of query results into multiple groups that respectively indicate multiple candidate content items comprise instructions which, when executed by the one or more computing devices, cause performance of:

excluding from the multiple candidate content items any candidate content items that correspond to groups having a frequency of query results that is less than a certain frequency.

Enumerated Example Embodiment 91. The one or more storage media as recited in Enumerated Example Embodiment 88, wherein the instructions that cause identifying the matching content item comprise instructions which, when executed by the one or more computing devices, cause performance of:

identifying as the matching content item that one candidate content item, of the multiple candidate content items, which has the trend that is verified first against a threshold.

Enumerated Example Embodiment 92. One or more storage media storing one or more sequences of instructions for trend detection based on a RANSAC algorithm, which instructions, when executed by one or more computing devices, cause performance of one or more steps from the steps comprising:

applying the RANSAC algorithm and determining a confidence score for each candidate content item of multiple candidate content items that represent multiple groups which include query results obtained in response to a plurality of fingerprint queries;

applying the RANSAC algorithm for each candidate content item of the multiple candidate content items, wherein at each iteration loop of the RANSAC algorithm processing is not performed for any coefficient values that are outside particular corresponding ranges; and applying the RANSAC algorithm and verifying against a threshold the trend determined for at least one candidate content item of the multiple candidate content items, wherein verifying against the threshold comprises one or more of:

comparing an in-lier threshold value to a segment count of segments from a query content item, wherein each segment represents a normalized in-lier data point; and comparing a density threshold value to a density metric that represents the number of normalized in-lier data points per second within the query content item.

Enumerated Example Embodiment 93. The one or more storage media as recited in Enumerated Example Embodiment 92, wherein:

the trend for said at least one candidate content item is a linear trend and the coefficient values include a slope value of the linear trend;

the confidence score for each candidate content item of the multiple candidate content items is computed based on the multiplicative function $$S = N_{inlier} * \max(e^{-10*|k-1|}, e^{-10*0.15})$$

wherein "S" is the confidence score for said each candidate content item, wherein "$N_{inlier}$" is the number of in-lier data points of a linear trend determined for said each candidate content item, and wherein "k" is the slope value of the linear trend determined for said each candidate content item;

the one or more sequences of instructions further comprise instructions which, when executed by the one or more computing devices, cause performance of the step of identifying a matching content item from the multiple candidate content items based at least on the confidence scores determined for one or more of the multiple candidate content items.

Enumerated Example Embodiment 94. The one or more storage media as recited in Enumerated Example Embodiment 92, wherein:

the particular corresponding ranges are ranges of real numbers; and the one or more sequences of instructions further comprise instructions which, when executed by the one or more computing devices, cause performance of the step of identifying a matching content item from the multiple candidate content items.

Enumerated Example Embodiment 95. The one or more storage media as recited in Enumerated Example Embodiment 92, wherein the one or more sequences of instructions further comprise instructions which, when executed by the one or more computing devices, cause performance of the step of:

identifying a candidate content item of the multiple candidate content items as a matching content item, wherein the identified candidate content item has a trend that is verified first against the threshold.

Enumerated Example Embodiment 96. The one or more storage media as recited in any one of Enumerated Example Embodiments 68, 82, 87, and 91, wherein the one or more sequences of instructions further comprise instructions which, when executed by the one or more computing devices, cause performance of the step of:

determining a model against which to match the query results;

wherein the instructions that cause applying the RANSAC algorithm further comprise instructions which, when executed by the one or more computing devices, cause applying the RANSAC algorithm based on the determined model.

Enumerated Example Embodiment 97. The one or more storage media as recited in any one of Enumerated Example Embodiments 68, 82, 87, and 91, wherein the trend is one of a linear trend and a non-linear trend.

Enumerated Example Embodiment 98. One or more storage media storing one or more sequences of instructions which, when executed by one or more computing devices, cause performance of steps comprising:

accessing a plurality of query results that are obtained in response to a plurality of fingerprint queries that are performed against a fingerprint database;

wherein up to a first number of multiple different query results, of the plurality of query results, are returned for at least a particular fingerprint query of the plurality of fingerprint queries;

grouping the plurality of query results, including the multiple different query results, into multiple groups that respectively indicate multiple candidate content items, wherein each candidate content item is associated with a set of data points that are derived from query results included in a distinct group, of the multiple groups, that corresponds to said each candidate content item;

applying a trend detection mechanism for each candidate content item, of the multiple candidate content items, in order to determine a trend that fits the set of data points associated with said each candidate content item;

based on trends determined for the multiple candidate content items, identifying matching content items from up to a second number of candidate content items from the multiple candidate content items, wherein the second number is greater than or equal to the first number.

Enumerated Example Embodiment 99. The one or more storage media as recited in Enumerated Example Embodiment 98, wherein the trend detection mechanism comprises a bin-counting linear trend detection mechanism.

Enumerated Example Embodiment 100. The one or more storage media as recited in Enumerated Example Embodiment 98, wherein the trend detection mechanism comprises a RANSAC-based trend detection mechanism.

Enumerated Example Embodiment 101. The one or more storage media as recited in Enumerated Example Embodiment 98, wherein the one or more sequences of instructions further comprise instructions which, when executed by the one or more computing devices, cause performance of receiving user input that specifies the first number and the second number.

Enumerated Example Embodiment 102. The one or more storage media as recited in Enumerated Example Embodiment 98, wherein the first number is equal to the second number.

Enumerated Example Embodiment 103. A computer readable storage medium comprising instructions which, when executed or performed by one or more processors, cause the one or more processors to perform or control one or more steps of a method as recited in one or more of Enumerated Example Embodiments 1-51.

Enumerated Example Embodiment 104. A system, comprising: means for performing or controlling one or more steps of a method as recited in one or more of Enumerated Example Embodiments 1-51.

Enumerated Example Embodiment 105. A computing apparatus, comprising:
- a computer readable storage medium comprising encoded instructions; and
- one or more processors which, when executing or performing the encoded instructions, cause the one or more processors to perform, execute or control one or more steps of a method as recited in one or more of Enumerated Example Embodiments 1-51.

Enumerated Example Embodiment 106. A use for a computer system, comprising:
- executing, performing, processing, computing or controlling one or more steps of a method as recited in one or more of Enumerated Example Embodimenst 1-51.

What is claimed is:

1. A method for fingerprint-based content identification, comprising the steps of:
   detecting trends with a RANSAC-based mechanism by deriving confidence scores that are computed for multiple candidate content items, wherein the trends detected for the candidate content items are compared against a threshold in order of decreasing confidence score until a trend that satisfies the threshold is found,
   wherein the confidence score is based on values of one or more coefficients and the number of in-lier data points of the trend determined according to the underlying model for that candidate content item,
   wherein the trend is exhibited by multiple query results that are obtained from a fingerprint database for query fingerprints extracted from the query content item,
   wherein the trend is further exhibited by data points associated with that candidate content item,
   wherein a data point is represented by a pair of time values, where the first value in the pair is the time location of a query fingerprint within the query content item, and the second value in the pair is the time location of a matching reference fingerprint within a candidate content item, and
   wherein at each iteration loop of the RANSAC algorithm processing is not performed for any coefficient values of the underlying model that are outside particular corresponding ranges; and
   computing an identity of the query content item based on the detected trends;
   wherein the method is performed by one or more computing devices.

2. The method as recited in claim 1, wherein detecting the trend with the RANSAC-based mechanism by deriving confidence scores comprises:
   determining a time window for the query content item;
   accessing query results that are obtained in response to fingerprint queries that are performed against a fingerprint database, wherein the fingerprint queries specify query fingerprints that are extracted from the query content item within the time window;
   grouping the query results into multiple groups that respectively indicate the multiple candidate content items, wherein each candidate content item is associated with a set of data points that are derived from those query results that are included in a group that corresponds to said each candidate content item;
   applying a RANSAC algorithm for each candidate content item, of the multiple candidate content items, in order to determine a trend that fits the set of data points associated with said each candidate content item;
   determining a confidence score for each candidate content item of the multiple candidate content items;
   sorting the multiple candidate content items based on the confidence score determined for each candidate content item;
   starting with the candidate content item having the highest confidence score, verifying against a threshold the trend determined for at least one candidate content item of the multiple candidate content items; and
   identifying as a matching content item that one candidate content item, of the multiple candidate content items, which has the trend that is verified first against the threshold.

3. The method as recited in claim 1, wherein ranking the fingerprint derived content identifications comprises:
   accessing query results that are obtained in response to fingerprint queries that are performed against a fingerprint database;
   wherein a first number of multiple different query results are returned for at least a particular fingerprint query of the fingerprint queries;
   grouping the query results, including the multiple different query results for the particular fingerprint query, into multiple groups that respectively indicate the multiple candidate content items, wherein each candidate content item is associated with a set of data points that are derived from those query results that are included in a distinct group, of the multiple groups, that corresponds to said each candidate content item;
   applying a trend detection mechanism for each candidate content item, of the multiple candidate content items, in order to determine a trend that fits the set of data points associated with said each candidate content item;
   based on trends determined for the multiple candidate content items, identifying as the matching duplicate or multiple reference content items a second number of candidate content items from the multiple candidate content items, wherein the second number is greater than or equal to the first number.

4. A method for fingerprint-based content identification, comprising:
   accessing a plurality of query results that are obtained in response to a plurality of fingerprint queries that are performed against a fingerprint database, wherein the plurality of fingerprint queries specify query fingerprints that are extracted from a query content item within a time window;
   grouping the plurality of query results into multiple groups that respectively indicate multiple candidate content items, wherein each candidate content item is associated with a set of data points that are derived from query results included in a group that corresponds to said each candidate content item, wherein a data point is represented by a pair of time values, where the first value in the pair is the time location of a query fingerprint within the query content item, and the second value in the pair is the time location of a matching reference fingerprint within a candidate content item;
   detecting trends with a RANSAC-based mechanism by deriving confidence scores that are computed for said multiple candidate content items, wherein the trends detected for the candidate content items are compared against a threshold in order of decreasing confidence score until a trend that satisfies the threshold is found, wherein the confidence score is based on values of one or more coefficients and the number of in-lier data points of the trend determined according to the underlying model for that candidate content item, wherein the trend is exhibited by multiple query results that are obtained from a fingerprint database for query fingerprints extracted from the query content item, wherein the trend is further exhibited by data points associated with that candidate content item, wherein detecting trends with the RANSAC algorithm for said each candidate content item comprises foregoing processing for any trends that have one or more coefficient values of the underlying model that are outside one or more corresponding ranges; and based on the trends determined for the multiple candidate content items, identifying, from the multiple candidate content items, a matching content item for the query content item;

wherein the method is performed by one or more computing devices.

5. The method as recited in claim 4, wherein the one or more corresponding ranges are ranges of real numbers.

6. The method as recited in claim 4, wherein grouping the plurality of query results into multiple groups that respectively indicate multiple candidate content items comprises:

excluding from the multiple candidate content items any candidate content items that correspond to groups having a frequency of query results that is less than a certain frequency.

7. The method as recited in claim 4, wherein identifying the matching content item comprises:

identifying as the matching content item that one candidate content item, of the multiple candidate content items, which has the trend that is verified first against a threshold.

* * * * *